United States Patent
Shibuya et al.

(10) Patent No.: US 8,682,824 B2
(45) Date of Patent: Mar. 25, 2014

(54) METHOD AND DEVICE FOR MONITORING THE STATE OF A FACILITY

(75) Inventors: Hisae Shibuya, Chigasaki (JP); Shunji Maeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 186 days.

(21) Appl. No.: 13/383,841

(22) PCT Filed: Jul. 28, 2010

(86) PCT No.: PCT/JP2010/004789
§ 371 (c)(1),
(2), (4) Date: Feb. 17, 2012

(87) PCT Pub. No.: WO2011/024382
PCT Pub. Date: Mar. 3, 2011

(65) Prior Publication Data
US 2012/0290879 A1    Nov. 15, 2012

(30) Foreign Application Priority Data

Aug. 28, 2009  (JP) ................. 2009-198561
Apr. 9, 2010   (JP) ................. 2010-090286

(51) Int. Cl.
    *G06N 5/00*    (2006.01)
(52) U.S. Cl.
    USPC .......................................... 706/45
(58) Field of Classification Search
    USPC .......................................... 706/45
    See application file for complete search history.

(56) References Cited

U.S. PATENT DOCUMENTS

| | | |
|---|---|---|
| 6,952,662 B2 | 10/2005 | Wegerich et al. |
| 6,975,962 B2 | 12/2005 | Wegerich et al. |
| 2011/0191076 A1 | 8/2011 | Maeda et al. |

FOREIGN PATENT DOCUMENTS

| | | |
|---|---|---|
| JP | 63-12093 | 1/1988 |
| JP | 11-338848 | 12/1999 |
| JP | 2002-182736 | 6/2002 |
| JP | 2003-114294 | 4/2003 |
| JP | 3631118 | 12/2004 |
| JP | 2009-70071 | 4/2009 |
| JP | 2010-92355 | 4/2010 |
| JP | 2010-191556 | 9/2010 |
| JP | 2011-59790 | 3/2011 |
| JP | 2011-70635 | 4/2011 |
| JP | 2011-81697 | 4/2011 |
| JP | 2011-145846 | 7/2011 |

OTHER PUBLICATIONS

Da Silva, et al., A knowledge-based system approach for sensor fault modeling, detection and mitigation, Expert Systems with Applications, vol. 39, 2012, pp. 10977-10989.*
Stephan W. Wegerich et al., Nonparametric Modeling of Vibration Signal Features for Equipment Health Monitoring, IEEE 2003, vol. 7-3113.

* cited by examiner

*Primary Examiner* — Wilbert L Starks
(74) *Attorney, Agent, or Firm* — Antonelli, Terry, Stout & Kraus, LLP.

(57) ABSTRACT

This invention provides method for detecting advance signs of anomalies, event signals outputted from the facility are used to create a separate mode for each operating state, a normal model is created for each mode, the sufficiency of learning data for each mode is checked, a threshold is set according to the results of said check, and anomaly identification is performed using said threshold. Also, for diagnosis, a frequency matrix is created in advance, with result events on the horizontal axis and cause events on the vertical axis, and the frequency matrix is used to predict malfunctions. Malfunction events are inputted as result events, and quantized sensor signals having anomaly measures over the threshold are inputted as cause events.

21 Claims, 21 Drawing Sheets

FIG. 1C

- S111: INPUT EVENT SIGNAL 103 INTO MODE DIVIDING UNIT 104
- S112: MODE-DIVIDE EVENT SIGNAL
- S113: INPUT SENSOR SIGNAL (102) INTO FEATURE EXTRACTION 105
- S114: ACQUIRE FEATURE VECTOR FROM SENSOR SIGNAL
- S115: COMPUTE ANOMALY MEASUREMENT USING NORMAL MODEL BY DIVIDING FEATURE VECTOR FOR EACH MODE BY MEANS OF ANOMALY MEASUREMENT COMPUTATION UNIT 107
- S116: MEASURE ANOMALY BY COMPARING ANOMALY MEASUREMENT WITH THRESHOLD BY MEANS OF ANOMALY IDENTIFICATION UNIT 109
- S117: DIAGNOSE ANOMALY BY USING DETERMINATION RESULT OF ANOMALY IDENTIFICATION UNIT AND SENSOR SIGNAL 102 BY MEANS OF ANOMALY DIAGNOSIS UNIT 110
- END

FIG. 2A

| 2008/1/27 11:08 | Starter on |
| 2008/1/27 11:09 | Starter off |
| 2008/1/27 11:11 | Request module off |
| 2008/1/27 11:11 | Service selector switch manual |
| 2008/1/27 11:11 | Ready for automatic off |
| 2008/1/27 11:31 | Overspeed (relay) |
| 2008/1/27 11:31 | Mdule interface panel circuit breaker tripped |
| 2008/1/27 11:31 | Group alarm-shut down |
| 2008/1/27 11:31 | Ignition CAN communication failure |

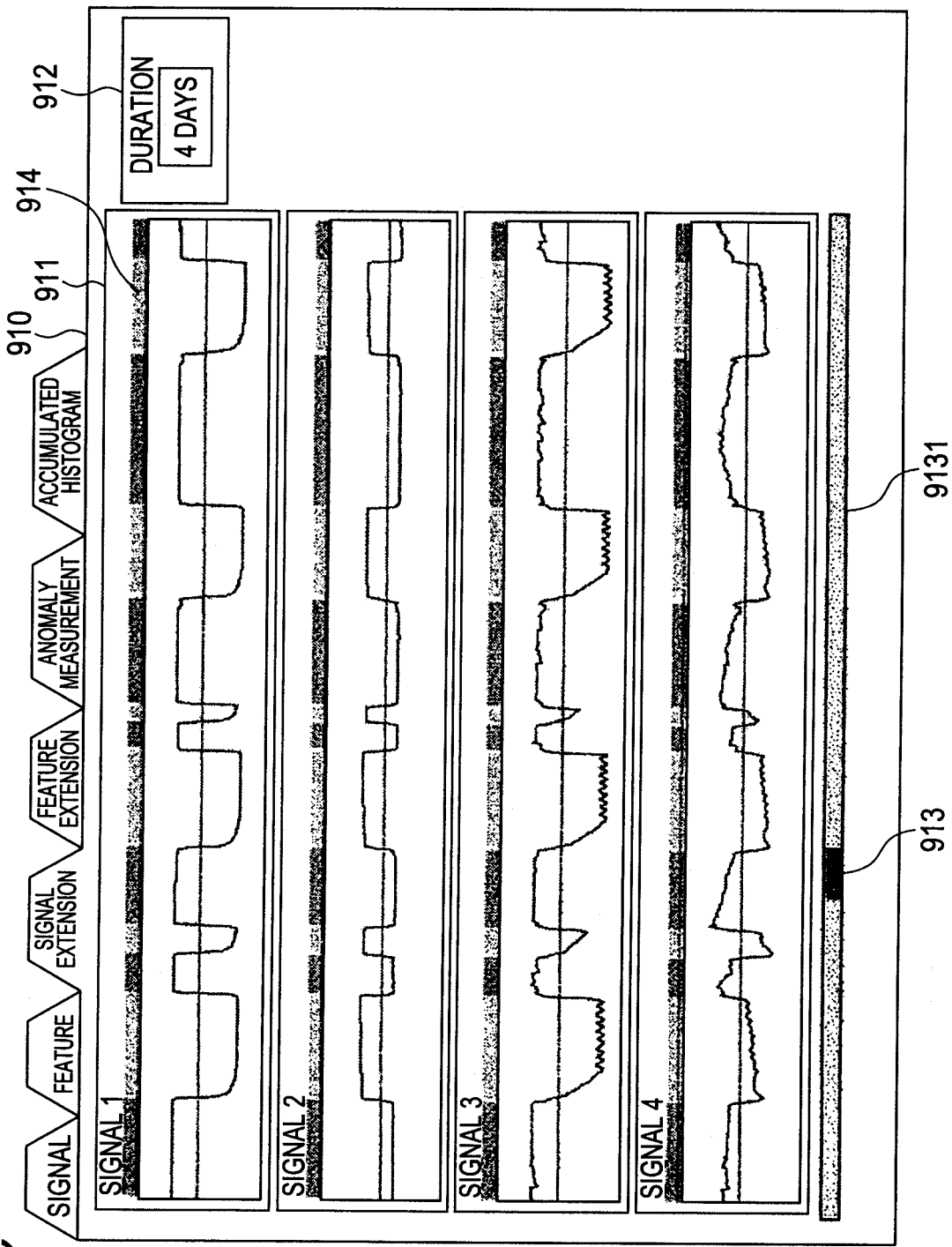

| | | RESULT EVENT | | | | | |
|---|---|---|---|---|---|---|---|
| | | A | B | C | D | E | ... | NO EVENT OCCURS |
| CAUSE EVENT | a | | | | | | | |
| | b | | | | | | | |
| | c | | | | | | | |
| | d | | | | | | | |
| | e | | | | | | | |
| | : | | | | | | | |

METHOD AND DEVICE FOR MONITORING THE STATE OF A FACILITY

TECHNICAL FIELD

The present invention relates to a method and a device for monitoring the state that detects an anomaly based on multi-dimensional time-series data output from a plant or facility early and diagnose a phenomenon.

BACKGROUND ART

Electric power companies supply hot water for district heating by using waste heat of a gas turbine or supply high-pressure steam or low-pressure stream for a factory. Petrochemical companies are operating the gas turbine, and the like as power facilities. In various plants or facilities using the gas turbine, and the like, preventive maintenance that detects malfunctions in the facilities or indications thereof is very important to even minimally suppress damages to a society. Further, an anomaly diagnosis that describes an anomaly phenomenon as well as the detection is also important to take appropriate actions.

In addition to the gas turbine or a stream turbine, even in a turbine in a hydroelectric plant, a nuclear reactor in a nuclear power plant, a windmill of a wind power plant, an engine of an aircraft or a heavy machine, a railroad vehicle or a track, an escalator, an elevator, and an apparatus/component level, facilities requiring the preventive maintenance such as the deterioration/lifespan of mounted batteries are numerous. In recent years, detecting anomalies (various symptoms) for a human body becomes also important for health management as shown in an electroencephalogram measurement/diagnosis.

As a result, U.S. Pat. No. 6,952,662 (Patent Literature 1) or U.S. Pat. No. 6,975,962 (Patent Literature 2) discloses an anomaly detecting method primarily targeting an engine.

In the anomaly detecting method, with past data, i.e., a time-series sensor signal as a database, the similarity between observational data and past learning data is calculated in an independent method and an estimate value is computed by linear coupling of data having high similarity to output a displacement degree between the estimate value and the observational data.

Further, Japanese Patent No. 3,631,118 discloses an anomaly diagnosing method of evaluating the similarity between input data and case data with the case data registered as the database and outputting a predetermined event name corresponding to a case having the highest similarity in advance.

CITATION LIST

Patent Literature

Patent Literature 1: U.S. Pat. No. 6,952,662
Patent Literature 2: U.S. Pat. No. 6,975,962
Patent Literature 3: Japanese Patent No. 3631118

Non Patent Literature

Non Patent Literature 1: Stephan W. Wegerich; Nonparametric modeling of vibration signal features for equipment health monitoring, Aerospace Conference, 2003. Proceedings. 2003 IEEE, Volume 7, Issue, 2003 Page(s): 3113-3121

SUMMARY OF INVENTION

Technical Problem

In the method disclosed in Patent Literature 1 or Patent Literature 2, if observational data not included in the learning data is observed, all of them are treated as data not included in the learning data to be judged as a displacement value and judged as an anomaly even in a normal signal, thereby remarkably deteriorating inspection reliability. As a result, a user needs to exhaustively store past various-state data in the database as the learning data.

Meanwhile, when the anomaly is mixed into the learning data, a divergence degree from the observational data showing the anomaly is reduced to be overlooked. As a result, sufficient checks are required to prevent the anomaly from being included in the learning data. However, since methods for exhaustive data collection and exclusion of the anomaly are not disclosed in Patent Literature 1 or Patent Literature 2, the user bears the burden. Since it is necessary to elaborately handle a temporal change or a surrounding environmental variation, or a repairing operation such as component replacement or not, it is substantially difficult and impossible to perform the handling personally in many cases.

In the method disclosed in Patent Literature 3, since the case corresponding to the event is recorded in the database as it is, the ground for the anomaly judgment cannot be explained, and as a result, it is difficult to convince the user. Further, anomaly prior-warning and the event are not associated with each other.

Accordingly, an object of the present invention is to provide a method and a system for monitoring the state of facility that solves the problems and includes an anomaly prior-warning detecting method capable of detecting an anomaly prior-warning with high sensitivity without increasing a user burden even though learning data is insufficient and an anomaly diagnosis method enabling the detection and a description of the anomaly and anomaly prior-warning, i.e., describing which state of the sensor signal is based on the anomaly judgment.

Further, an object of the present invention is to provide an anomaly prior-warning detection method capable of creating a high-precision normal model by using only appropriate learning data without increasing the user burden even when an anomaly is mixed into the learning data.

In addition, a used sensor item needs to be looked over in order to detect the anomaly prior-warning with high precision, however, a selection method of the sensor item is not described in Patent Literature 1 or 2, and as a result, a user's efforts are required.

Accordingly, an object of the present invention is to provide an anomaly prior-warning detection method capable of creating the high-precision normal model by excluding a sensor item disturbing the sensitivity without increasing the user burden.

Solution to Problem

In order to achieve the objects, in the present invention, in monitoring the state of facility based on a time-series sensor signal and an event signal output from the facility or a manufacturing apparatus, or a measurement apparatus, mode dividing for each operating state is performed based on the event signal, a normal model is created for each mode based on the sensor signal, an anomaly measurement is computed by comparing the normal model and the sensor signal, sufficiency of learning data used to create the normal model for each mode is checked, and an anomaly is identified based on the anomaly measurement after sensitivity is set according to the sufficiency of the learning data.

Further, all events or a sensor signal judged as the anomaly is quantized to be set as a cause event, a failure event which occurs from occurrence of the cause event to the passage of a predetermined time is set as a result event, a frequency matrix of the cause event and the result event is created, and a failure which occurs within a predetermined time after a predetermined event occurs is predicted based on the matrix.

That is, in the present invention, a method for monitoring the state of facility that detects an anomaly based on a time-series sensor signal and an event signal output from the facility or an apparatus includes: a learning process of dividing a mode for each operating state based on the event signal, extracting a feature vector based on the sensor signal, creating a normal model for each mode based on the feature vector, checking sufficiency of the learning data used for creating the normal model for each mode, and setting a threshold in accordance with the sufficiency of the learning data; and an anomaly detecting process of dividing the mode for each operating state based on the event signal, extracting the feature vector based on the sensor signal, computing an anomaly measurement by comparing the feature vector with the normal model, and identifying the anomaly by comparing the threshold with the anomaly measurement.

Further, in the present invention, a method for monitoring the state of facility includes: mode-dividing a time-series event signal output from the facility or an apparatus in accordance with an operating state of the facility or apparatus; acquiring a feature vector from a time-series sensor signal output from the facility or apparatus; creating a normal model for each divided mode by using the mode dividing information and information on the feature vector acquired from the sensor signal; computing an anomaly measurement of the feature vector for each divided mode by using the created normal model; judging an anomaly by comparing the computed anomaly measurement with a predetermined threshold; and diagnosing whether the facility or apparatus is anomalistic by using the judged anomaly information and the sensor signal.

Further, in the present invention, a device for monitoring the state of facility includes: a mode dividing means inputting a time-series event signal output from the facility or an apparatus to mode-divide the event signal in accordance with an operating state of the facility or apparatus; a feature-vector computation means inputting the time-series sensor signal output from the facility or apparatus to acquire a feature vector from the input sensor signal; a normal-model creation means creating a normal model for each divided mode by using the mode dividing information from the mode dividing means and information on the feature vector of the sensor signal acquired by the feature-vector computation means; an anomaly-measurement computation means computing an anomaly measurement of the feature vector acquired by the feature-vector computation means for each divided mode by using the normal model created by the normal-model creation means; an anomaly judgment means judging an anomaly by comparing the anomaly measurement computed by the anomaly-measurement computation means with a predetermined threshold; and an anomaly diagnosis means diagnosing whether the facility or apparatus is anomalistic by using the information on the anomaly judged by the anomaly judgment means and the time-series sensor signal output from the facility or apparatus.

Further, in the present invention, in monitoring the state of facility based on a time-series sensor signal output from the facility or a manufacturing apparatus, or a measurement apparatus, a feature vector is extracted based on the sensor signal, a feature to be used is selected based on data check of the feature vector, learning data to be used are selected based on the data check of the feature vector, a normal model is created based on the feature vector, an anomaly measurement is computed by comparing the normal model and the sensor signal with each other, sufficiency of the learning data used to create the normal model is checked, and sensitivity is set according to the sufficiency of the learning data, and then, an anomaly is identified based on the anomaly measurement.

That is, in the invention, a method for monitoring the state of facility that detects an anomaly based on a time-series sensor signal output from the facility or an apparatus includes: a learning process of extracting a feature vector based on the sensor signal, selecting a feature to be used based on data check of the feature vector, selecting learning data to be used based on the data check of the feature vector, creating a normal model based on the feature vector, checking sufficiency of the learning data used for creating the normal model, and setting a threshold in accordance with the sufficiency of the learning data; and an anomaly detecting process of extracting the feature vector based on the sensor signal, computing an anomaly measurement by comparing the feature vector with the normal model, and identifying the anomaly by comparing the threshold with the anomaly measurement.

Advantageous Effects of Invention

According to the present invention, in order to perform mode dividing for each operating state and create a normal model for each mode, normal models corresponding to various states can be created with high precision. Further, sufficiency of learning data is checked for each mode and when data is insufficient, identification is performed by decreasing sensitivity to prevent misjudgment caused by insufficient data, thereby improving reliability of anomaly detection.

Further, a casual relationship between events can be learned by creating a frequency matrix of a cause event and a result event and in particular, the sensor signal is quantized to be set as the cause event, thereby associating the state of the sensor signal with an anomaly. In addition, a failure event which occurs from the occurrence time of the cause event to the passage of a predetermined time is set as the result event to associate an anomaly prior-warning and the occurrence of the failure with each other, and as a result, the failure occurrence can be predicted based on the state of the sensor signal.

As described above, even in a turbine in a hydroelectric plant, a nuclear reactor in a nuclear power plant, a windmill of a wind power plant, an engine of an aircraft or a heavy machine, a railroad vehicle or a track, an escalator, an elevator, and an apparatus/component level, in addition to facility such as a gas turbine or a stream turbine, facilities such as the deterioration/lifespan of mounted batteries, the anomaly and the anomaly prior-warning can be detected and diagnosed with high precision.

Further, according to the present invention, since the feature and the learning data which are used are automatically selected based on data check of the feature vector, the user can create a high-precision normal model only by inputting the whole sensor signals without looking over the used feature and learning data, such that high-sensitive anomaly detection can be implemented with a minimum effort.

BRIEF DESCRIPTION OF DRAWINGS

FIG. 1C is a flowchart illustrating a flow of processing when an anomaly is detected.

FIG. 2A is a signal list illustrating an example of an event signal.

FIG. 9C is a front view of a screen enlarging and displaying plural signal waveforms in an example of a display screen in checking learning data.

DESCRIPTION OF EMBODIMENTS

Hereinafter, the content of the present invention will be described in detail with reference to the drawings.

First Embodiment

Figure 1A:
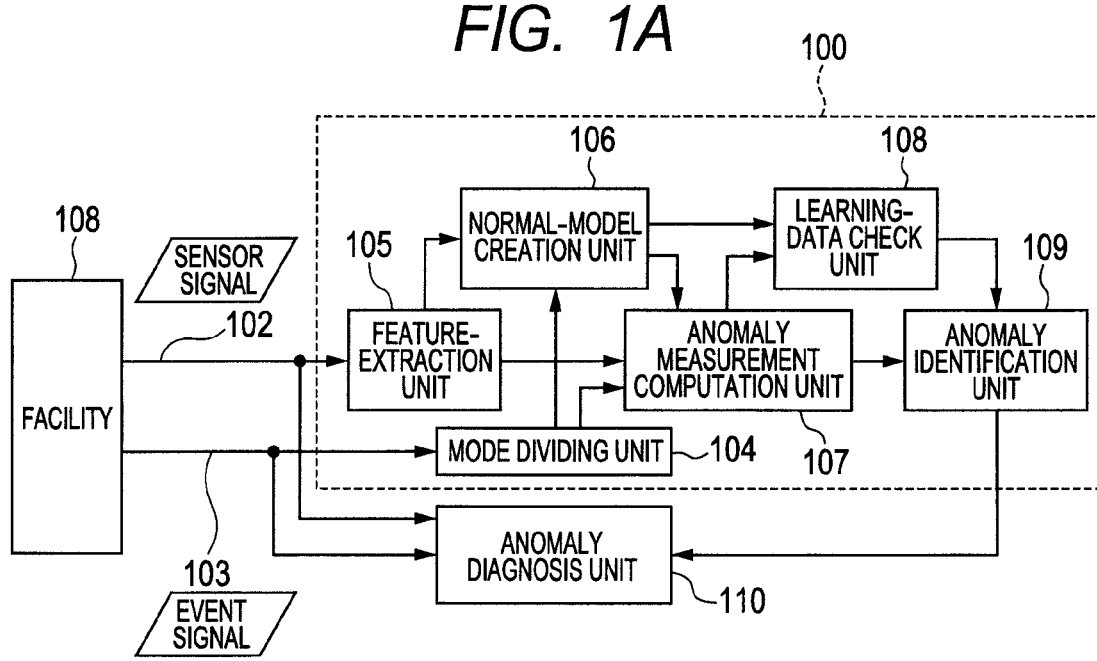
FIG. 1A is a block diagram illustrating a schematic configuration of a system for monitoring the state of facility of the present invention.

FIG. 1A illustrates one configuration example of a system that implements a method for monitoring the state of a facility of the present invention.

The system is configured to largely include a sensor signal analysis unit 100 and an anomaly diagnosis unit 110.

The sensor signal analysis unit is configured to include a feature amount extraction unit 105 that receives a sensor signal 102 output from facility 101 to perform feature selection, feature amount extraction, and feature conversion of the signal and acquire a feature vector, a mode dividing unit 104 that divides the time (in the following description, the dividing is referred to as mode dividing and a type of an operating state is referred to as a mode) according to a change in the operating state of the facility 101 by receiving an event signal 103 output from the facility 101, a normal-model creating unit creating a normal model by receiving outputs of the feature amount extraction unit 105 and the mode dividing unit 104, an anomaly-measurement computation unit 107 computing anomaly measurement from the sensor signal extracted by the feature amount extraction unit 105 by using the normal model created by the normal-model creation unit 106, a learning-data check unit 108 checking the normal model based on the anomaly measurement computed by the anomaly-measurement computation unit 107 with respect to the normal model created by the normal-model creation unit 106, an anomaly identification unit 109 identifying anomaly based on data of the normal model checked by the learning-data checking unit 108 and the anomaly measurement computed from the sensor signal 102 by using the anomaly-measurement computation unit 107, and an anomaly diagnosis unit 110 diagnosing anomaly of the facility 101 from the sensor signal 102 and the judgment result of the anomaly identification unit 109.

The operation of the system includes two phases of 'learning' that creates a model used for anomaly pre-detection or diagnosis in advance and 'evaluation' that actually performs anomaly pre-detection or diagnosis based on the model and an input signal. Basically, the former is off-line processing and the latter is on-line processing. In the following description, they are distinguished as in learning and in evaluation.

The facility 101 as a state monitoring target is a facility such as a gas turbine or a steam turbine or a plant. The facility 101 outputs the sensor signal 102 and the event signal 103 indicating the state thereof.

Figure 1B:
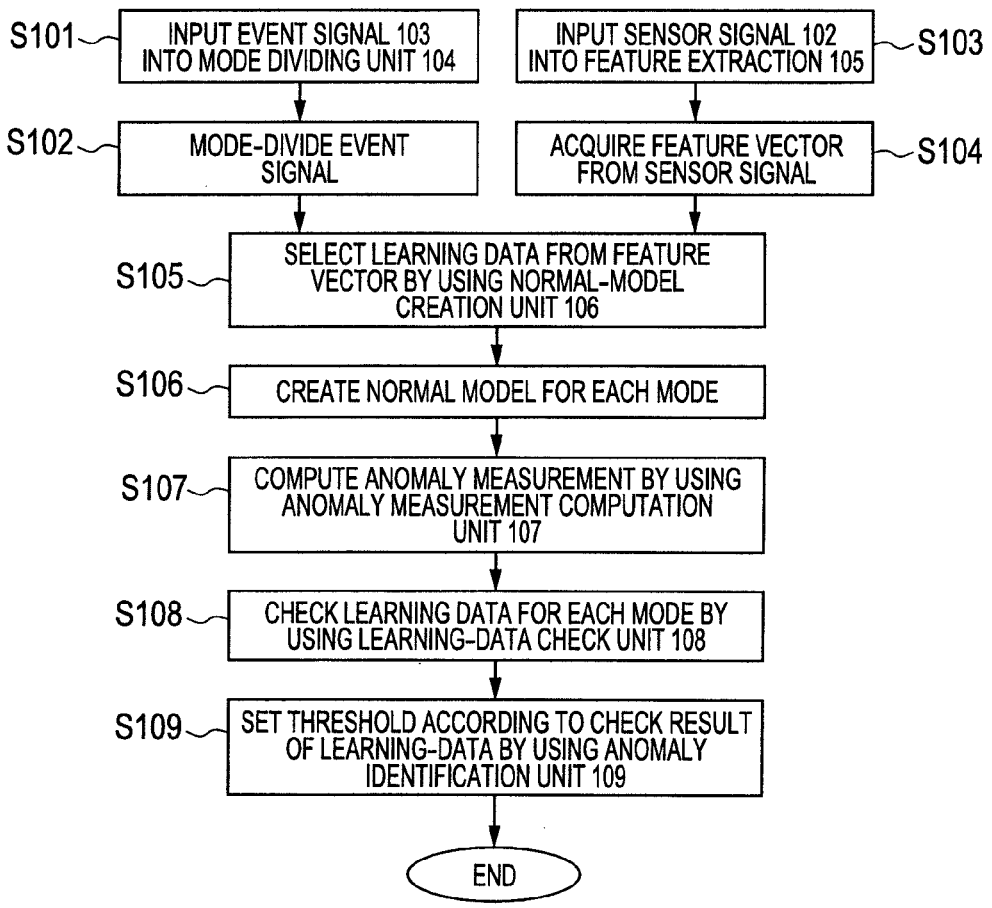
FIG. 1B is a flowchart illustrating a flow of processing in learning.

A flow of processing in learning will be described by using FIG. 1B. The mode dividing unit 104 inputs the event signal 103 output from the facility 101 (S101) and mode-divides an operating time of the facility 101 according to the change in the operating state (S102). Meanwhile, the feature amount extraction unit 105 inputs the sensor signal 102 output from the facility 101 (S103) and performs feature selection, feature amount extraction, and feature conversion, and acquires the feature vector (S104).

The mode dividing information from the mode dividing unit 104 and the feature vector information from the feature amount extraction unit 105 are input into the normal-model creation unit 106 to select the learning data from the feature vector (S105), perform learning for each mode by using the selected learning data, and create the normal model (S106). The created normal model is input into the anomaly-measurement computation unit 107 together with the feature vector information from the feature amount extraction unit 105 to compute the anomaly measurement (S107).

Subsequently, the learning-data check unit 108, sufficiency of the learning data used to create the normal model for each mode is examined based on the information on the anomaly measurement computed by the anomaly-measurement computation unit 107 (S108). That is, it is examined whether the created normal model can express a normal state in the mode normally. In the learning data judged that the normal state can be expressed in the corresponding mode by using the learning-data check unit 108, a threshold used to identify anomaly is set according to the check result (S109). That is, when the learning data is insufficient, the threshold is increased in order to prevent misjudgment of judging anomaly in spite of the normal state.

Subsequently, a flow of processing in evaluation will be described by using FIG. 10. The mode dividing unit 104 inputs the event signal 103 output from the facility 101 (S111) and divides the operating time of the facility 101 by mode (mode-divide) according to the change in the operating state (S112). Meanwhile, the feature amount extraction unit 105 inputs the sensor signal 102 output from the facility 101 (S113) and performs feature selection, feature amount extraction, and feature conversion, and acquires the feature vector (S114). The mode dividing information from the mode dividing unit 104 and the feature vector information from the feature amount extraction unit 105 are input into the anomaly-measurement computation unit 107 to classify the feature vector for each mode and are compared with the stored normal model created by the normal-model creation unit 106 in learning to compute the anomaly measurement (S115).

The computed anomaly measurement is input into the anomaly identification unit 109 and compared with the threshold set in learning to perform anomaly judgment (S116). The result of the anomaly judgment is sent to the anomaly diagnosis unit 110 to perform diagnosis on the sensor signal 102 at the time when an anomaly is judged in evaluation based on learned and stored information on the relations between the event signal 103 in learning and the sensor signal 102 at the time of anomaly judgment (S117).

Subsequently, operations of individual components shown in FIG. 1A will be described in detail sequentially.

Figure 2B:
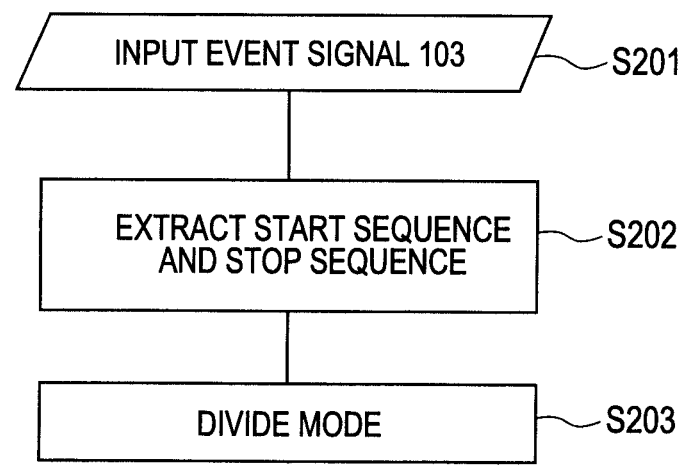
FIG. 2B is a flowchart illustrating a flow of processing after performing mode dividing by receiving the event signal.

A first embodiment of a mode dividing method in the mode dividing unit 104 will be described using FIGS. 2A to 2C. An example of the event signal 103 is shown in FIG. 2A. The event signal 103 is a signal indicating an operation, a failure, or a warning of the facility which is output irregularly and is constituted by a character string indicating the time and the operation, the failure, or the warning. As shown in FIG. 2B, the event signal 103 is input (S201) and extraction of a start sequence and a stop sequence is performed by retrieving a predetermined character string (S202). Based on the result, the mode is divided into 4 operating states of a 'normal OFF' mode 211 from an end time of the stop sequence to a start time of the start sequence, a 'start' mode 212 during the start sequence, a 'normal ON' mode 213 from an end time of the start sequence to a start time of the stop sequence, and a 'stop' mode 214 during the stop sequence (S203).

Figure 2C:
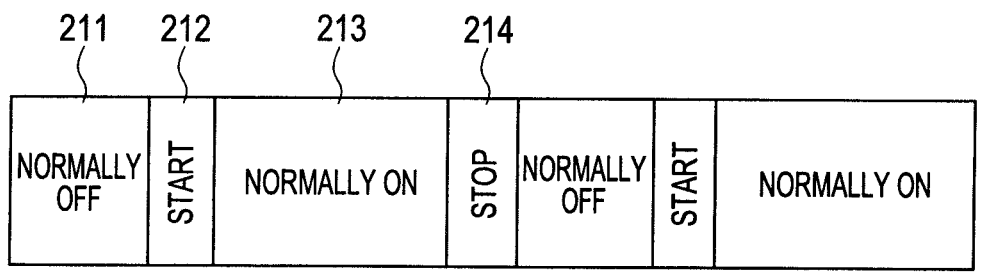
FIG. 2C is a mimetic diagram of the event signal illustrating the state in which an operating state of the facility is divided and classified into any one of four modes.

An example is shown in FIG. 2C. For sequence extraction, a start event and an end event of the sequence are designated in advance and the sequence is scanned and extracted from a head and a tail of the event signal 103 in the following method.

(1) In case not during the sequence, the start event is retrieved. When the start event is discovered, the sequence is started.

(2) In case during the sequence, the stop event is retrieved. When the stop event is discovered, the sequence is stopped.

Herein, the stop event includes the stop event of the designation, the start event of the failure, the warning, and the designation. In the case of the stop other than the stop event of the designation, the stop is recorded as an anomaly stop. Hereinafter, a period during the sequence which is sequentially extracted from the event signal as above and a period other than the period during the sequence are called a 'cluster'.

A second embodiment of the mod dividing method will be described by referring FIG. 3. The first embodiment is an example of the case in which the start and the stop of the start sequence and the stop sequence can be designated and the 4 modes will be shown in sequence. But herein, the second embodiment shows an example of the case in which the designation cannot be performed. First, the event signal 103 is input (S301) and the event signal 103 is separated when a time interval is equal to or more than the threshold (S302), and an event array is created from the remaining event signal. Subsequently, all unique event arrays are listed up (S303) and the similarity between the event arrays is examined (S304). For example, when the lengths of the event arrays are set as L1 and L2 and the numbers of deleted and added events required to change one side to the other side is C, the similarity is represented by the following equation.

$$(L1+L2-C)/(L1+L2) \quad \text{(Equation 1)}$$

For example, when an event array of one side is aabc and an event array of the other side is abb, L1=4, L2=3, and C=3 (the latter is acquired by deleting a and c from the former and adding b), the similarity is 4/7=0.571. Subsequently, similar event arrays are grouped based on the similarity between the event arrays and a label of the group is attached to all the event arrays (S305). An event occurrence period from a first time to a final time of the event array and an interevent period inserted between the event arrays are sequentially extracted from the sensor signal 102. The aforementioned cluster is acquired by the processing. The event occurrence period is classified into a mode corresponding to the label of the group and the intervening period is classified into a mode corresponding to a combination of prior and post groups (S306).

As described above, various operating states may be accurately divided by using event information, a simple state may be achieved for each individual mode, and as a result, subsequent creation of the model in the normal state may be performed with high accuracy.

A data processing method in learning by the feature amount extraction unit 105 and the normal-model creation unit 106 and an anomaly-measurement computation method in the anomaly-measurement computation unit 107 will be described with reference to FIGS. 4 to 7.

Figure 4:
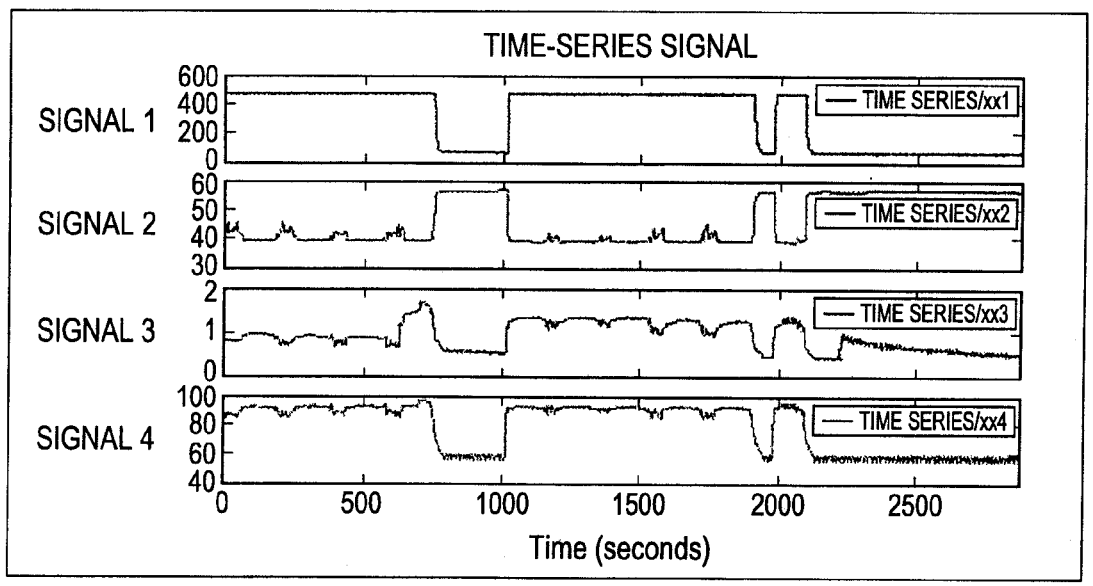
FIG. 4 is a signal waveform diagram illustrating an example of a sensor signal.

An example of the sensor signal 102 is shown in FIG. 4. The sensor signal 102 is plural time-series signals and herein, shows 4 types of signals of a signal 1 corresponding to time-series/xx1, a signal 2 corresponding to time-series/xx2, a signal 3 corresponding to time-series/xx3, and a signal 4 corresponding to time-series/xx4. Actually, the sensor signal is not limited to the 4 types and the signal types may be hundreds to thousands. The respective signals correspond to outputs from plural sensors installed in the facility 101 and for example, the temperatures of a cylinder, oil, cooling water, and the like, or the pressure of the oil or the cooling water, a rotational speed of a shaft, a room temperature, an operating time, and the like are measured at regular intervals. The sensor signal may include a control signal for controlling something with a predetermined value as well as showing the output or state. In the present invention, the data are treated as multi-dimensional time-series signals.

Figure 5:
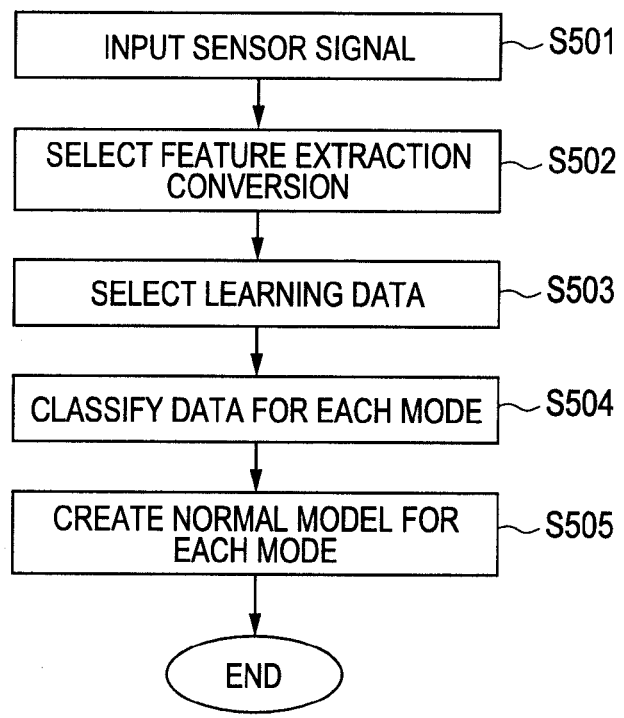
FIG. 5 is a flowchart illustrating an example of a normal model creation processing sequence.

In FIG. 5, a normal model creation processing flow processed by using the feature amount extraction unit 105 and the normal-model creation unit 106 is shown. In the processing flow, first, the sensor signal 102 is input into the feature amount extraction unit 105 (S501) and processing of feature amount extraction, conversion, and selection is performed (S502). Subsequently, the processed data are input into the normal-model creation unit 106 to select the learning data (S503), the learning data are classified for each mode by referring to the mode dividing information output from the mode dividing unit 104 (S504), and the normal model is created for each mode (S505).

Subsequently, each step will be described in detail.

First, in step (S501), the feature amount extraction unit 105 inputs the sensor signal 102.

Subsequently, in step (S502), the feature amount extraction unit 105 performs feature selection, feature amount extraction, and feature conversion and acquires the feature vector. Although not shown, the sensor signal 102 is accumulated in advance and uses a signal during a predetermined period as an input. Further, the event signal 103 is also accumulated during the same period for dividing the mode.

In the feature selection, as minimum processing, a sensor signal having very small distribution and a sensor signal which increases monotonically need to be excluded. Further, deleting an invalid signal by a correlation analysis is also considered. This is a method in which a correlation analysis is performed with respect to the multi-dimensional time-series signals and when similarity is very high in terms of plural signals of which correlation values are close to 1, redundant signals are deleted from the plural signals due to redundancy and non-redundant signals are left. Besides, a user may designate the signals to be excluded. The selected sensor is stored to use the same sensor signal in evaluation.

The feature amount extraction is considered using the sensor signal as it is. A window of ±1, ±2, etc., is set with respect to a predetermined time and a feature indicating a time variation of data may be extracted by a feature vector of a window width (3, 5, etc.,)×the number of sensors. Further, the feature may be resolved into a frequency component by performing discrete wavelet transform (DWT). Further, each feature may be subjected to canonicalization of transforming means so as to the mean and the distribution be 0 and 1, respectively, by using the mean and the standard deviation. The mean and the standard deviation of each feature are stored so as to perform the same transformation in evaluation.

Alternatively, normalization may be performed by using a maximum value and a minimum value or predetermined upperlimit value and lowerlimit value. The processing is used to treat sensor signals having different units and scales simultaneously.

In the feature conversion, various techniques including principal component analysis (PCA), independent component analysis (ICA), non-negative matrix factorization (NMF), projection to latent structure (PLS), canonical correlation analysis (CCA), and the like are used and any technique may be used or the techniques may be combined and used, and the conversion may not be performed. It is easy to use the principal component analysis, the independent component analysis, and the non-negative matrix factorization because setting a target variable is not required. Parameters such as a conversion matrix required for conversion are stored to achieve the same conversion as the conversion at the time of creating the normal model in evaluation.

Subsequently, in step S503, data of which the feature is converted is input into the normal-model creation unit 106 and the learning data is selected in the normal-model creation unit 106. First, since there is a case that the acquired multi-dimensional time-series signal is partly lost, such data is deleted. For example, when most sensor signals output 0 simultaneously, all signal data at a corresponding time are deleted. Subsequently, signal data which is anomalistic is removed. Specifically, a time when a warning or a failure occurs is examined from the event signal 103 and all signal data of the cluster (periods sequentially extracted in the aforementioned mode dividing) including the time are removed.

Subsequently, in step S504, the normal-model creation unit 106 classifies the learning data selected in step S503 for each of the modes divided by the mode dividing unit 104 and creates the normal model for each mode in step S505.

Figure 6:
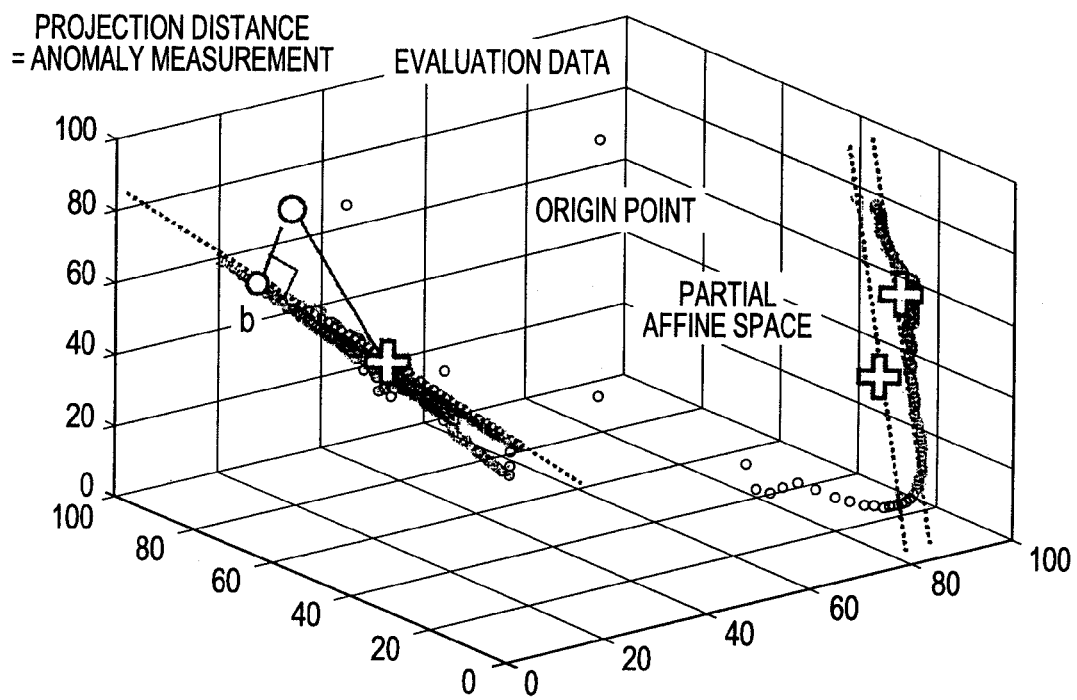
FIG. 6 is a graph of a 3D coordinate describing a projection distance method.

As a normal model creation technique, a projection distance method (PDM) or a local sub-space classifier (LSC) is considered. The projection distance method is a method of creating a partial space having a unique origin point with respect to the learning data, that is, an affine partial space (a space having maximum distribution). The affine partial space is created for each cluster as shown in FIG. 6. In the figure, an example in which a 1D affine partial space is created in a 3D feature space is shown, but the dimension of the feature space may be further higher and the dimension of the affine partial space may also be any dimension as long as the dimension of the affine partial space is smaller than the feature space and smaller than the number of the learning data.

A computation method of the affine partial space will be described. First, the mean $\mu$ and the covariance matrix $\Sigma$ of the learning data are obtained and subsequently, an eigenvalue problem of $\Sigma$ is solved to set as an orthonormal basis of the affine partial space a matrix U in which eigenvectors corresponding to r predetermined eigenvalues are arrayed from the larger eigenvalue. The anomaly measurement computed by the anomaly-measurement computation unit 107 is defined as a minimum value of d which is a projection distance to the affine partial space of each cluster that belongs to the same mode as evaluation data obtained from the sensor signal 102 through the feature amount extraction unit 105. Herein, instead of creating the affine partial space for each cluster, all of the clusters of the same mode may be collected to create the affine partial space. According to this method, the number of times of calculating the projection distance may be small and the anomaly measurement may be computed at a high speed. Further, the anomaly measurement is basically computed in real time.

Figure 7:
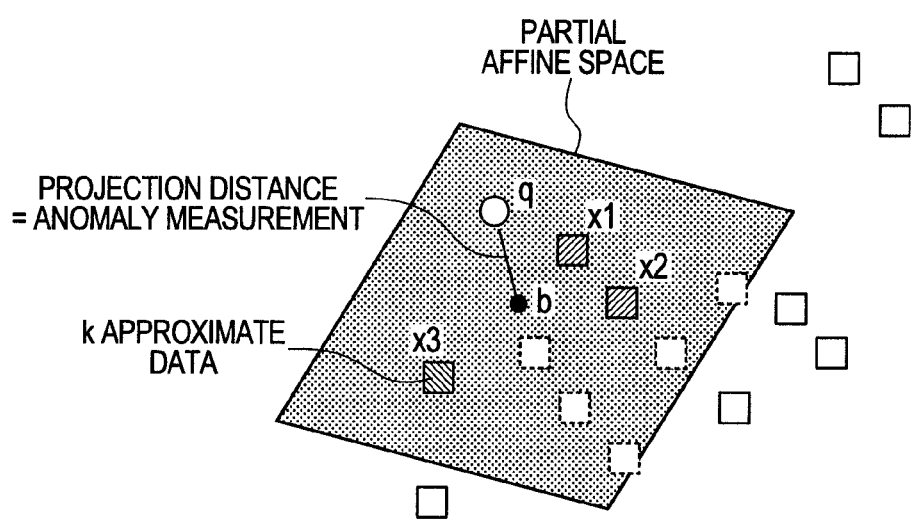
FIG. 7 is a diagram describing a local sub-space classifier.

Meanwhile, the local sub-space classifier is a method of creating a k-1-dimensional affine partial space by using k-approximate data of evaluation data q. An example of a case in which k=3 is shown in FIG. 7. As shown in FIG. 7, since the anomaly measurement is expressed by the projection distance shown in the figure, a point b on the affine partial space which is the closest to the evaluation data q may be obtained. In order to compute b from the evaluation data q and the k-approximate data xi (i=1 . . . , k), from a matrix Q in which k qs are arrayed and a matrix X in which xi is arrayed, $$C = (Q-X)^T(Q-X) \qquad \text{(Equation 2)}$$

a correlation matrix C is obtained by Equation 2.

$$b = \frac{C^{-1} 1_n}{1_n^T C^{-1} 1_n} \qquad \text{(Equation 3)}$$

b is calculated by Equation 3.

In this method, since the affine partial space cannot be created if the evaluation data is not input, the normal-model creation unit 106 performs the selection of the learning data and the data classification for each mode shown in FIG. 5, and further, constructs a kd tree for efficiently finding the k-approximate data for each mode. The kd tree represents a spatial division data structure of classifying points in a k-dimensional Euclidean space. Dividing is performed by using only a vertical plane in one coordinate axis and one point is configured to be stored in each leaf node. The anomaly-measurement computation unit 107 acquires the k-approximate data of the evaluation data by using the kd tree that belongs to the same mode as the evaluation data, acquires the above point b therefrom, and computes a distance between the evaluation data and the point b to be used as the anomaly measurement.

Besides, the normal model may be created by using various methods including Mahalanobis Taguchi method, a regression analysis method, a nearest method, a similarity base model, a 1 class SVM, and the like.

Figure 8:
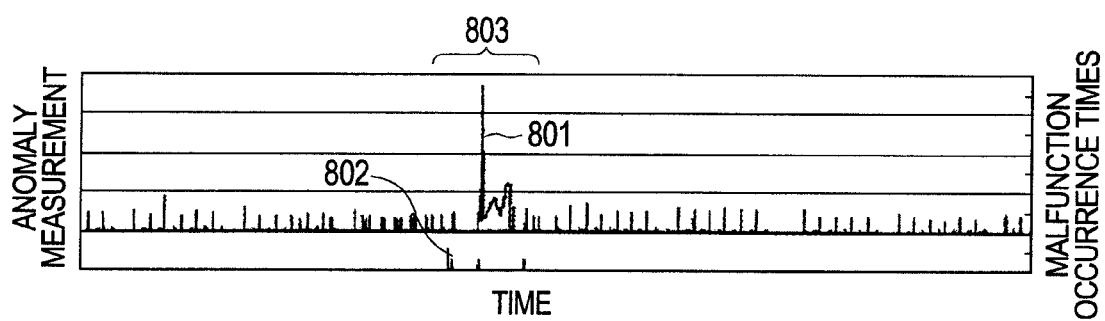
FIG. 8 is a graph illustrating an example of an anomaly measurement computation result.

Subsequently, a method of checking sufficiency of the learning data in the learning-data check unit 108 will be described by using FIGS. 8 and 9. FIG. 8 illustrates an example in which the anomaly measurement is computed by using the aforementioned projection distance method based on the sensor signal 102 and the event signal 103. A graph 801 illustrates the anomaly measurement, a graph 802 illustrates the number of times of failure occurrences, and a horizontal axis illustrates the time. It can be seen that the failure occurs and the anomaly measurement increases at the time of 803. However, the anomaly measurement increases even in other ranges, and as a result, it is difficult to determine the threshold to prevent a false report from being output.

The anomaly measurement increases in spite of the normal state during a transient period from one normal state to the other normal state of the 'start' mode or 'stop' mode. That is, since the learning data is insufficient, the state of the mode is not sufficiently expressed. Therefore, the sufficiency of the learning data is acquired for each mode, and as a result, the threshold may be determined for each mode.

The sufficiency is checked by, for example, cross validation of the learning data. The cross validation is a method called a k-fold cross validation. Data is divided into k groups, the model is created with one group among them as the evaluation data and the other groups as the learning data, and the anomaly measurement is computed. When the same processing is performed with respect to all the k groups while changing the evaluation data, the anomaly measurement may be computed with respect to all data. Herein, a model of which k is larger may be close to all learning data models and since a calculation time is extended, appropriate k needs to be selected.

When the anomaly measurement is computed with respect to all data, a frequency distribution (histogram) of the anomaly measurement is created for each mode. An accumulation histogram is created based thereon and a value which reaches a ratio close to 1 which is designated in advance is acquired. As the value is larger, the learning data may be insufficient. The threshold is determined for each mode by processing such as adding an offset to the value or multiplying the value by a constant factor. The identification unit 109 judges the anomaly when the anomaly measurement is equal to or more than the threshold as determined above.

FIG. 9 is an example of a GUI associated with checking the learning data. A signal display screen, a feature display screen, a signal enlargement display screen, a feature enlargement display screen, an anomaly measurement display screen, and an anomaly measurement accumulation histogram screen are changed by selecting a menu (selecting a tab displayed in the upper part of each screen).

Figure 9A:
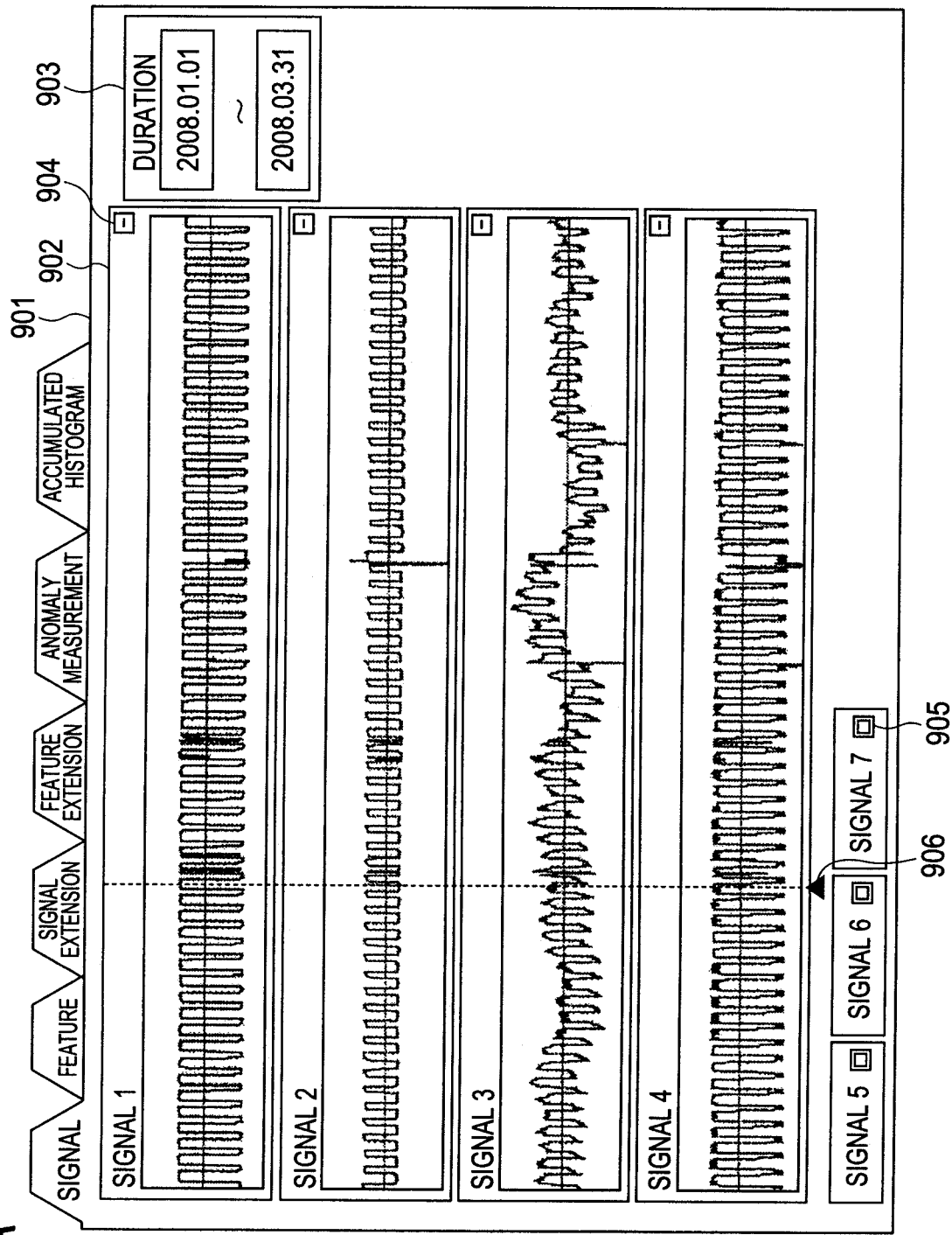
FIG. 9A is a front view of a screen displaying plural signal waveforms in an example of a display screen in checking learning data.

The signal display screen 901 is shown in FIG. 9A. The signal display screen 901 is constituted by plural signal display windows 902 and the sensor signal 102 during a period designated as the learning data in advance is displayed in each window as time-series data for each sensor (for each signal). The period of the learning data is displayed on a period display window 903 and may also be designated through the window. That is, the period to be displayed is designated by a period display window to click a period designation button 912, thereby switching and displaying data during a period displayed on the signal display window 902 at present to data during a designated period. The display or non-display of each window 902 is selectable by a minimization button 904 or a maximization button 905 and a display order is changeable by a drag-and-drop operation. In FIG. 9A, signals from 1 to 4 are maximized and signals from 5 to 7 are minimized. A cursor 906 indicates an origin point in enlarged display and may move by operating a mouse and a keyboard.

Figure 9B:
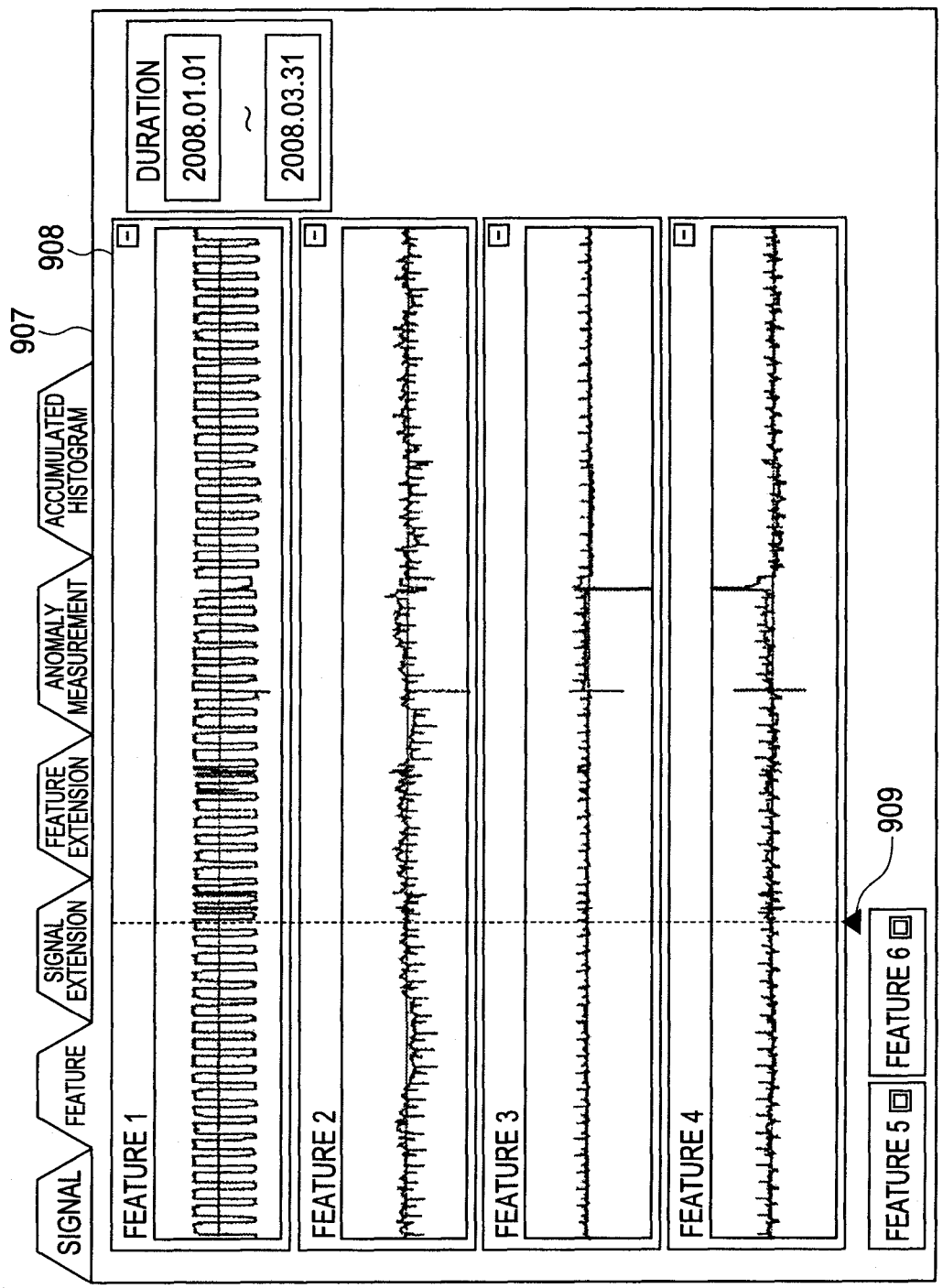
FIG. 9B is a front view of a screen displaying plural feature vectors in an example of a display screen in checking learning data.

A feature display screen 907 is shown in FIG. 9B. The feature display screen 907 is constituted by plural feature display windows 908 and the feature vector output from the feature amount extraction unit 105 is displayed on each window as the time-series data for each dimension. The selection of the display or non-display and the operating of the display order are the same as those in the signal display screen 901. A cursor 909 is displayed at the same time as the cursor 906 of the signal display screen 901 and may move on this screen.

The signal enlargement display screen 910 is shown in FIG. 9C. The signal enlargement display screen 910 is constituted by plural signal enlargement display windows 911. On each window, the enlargement display of the signal is performed on the signal display screen 901 as the time indicated by the cursor 906 as an origin point. The display or non-display of the signal and the display order are the same as those in the signal display screen 901. On the period designation window 912, a period from the origin point to an end point of the display is designated by the time unit or daily unit. The origin point of the display is changeable by a scroll bar 913 and the change is reflected to the positions of the cursor 906 and the cursor 909. A total length of a scroll bar display area 9131 corresponds to a period designated by the period display window 903 of the signal display screen 901 or the feature display screen 907. Further, the length of the scroll bar 913 corresponds to the period designated by the period designation window 912 and a left end of the scroll bar 913 corresponds to an origin point of each signal displayed on the signal enlargement display window 911. Modes showing the aforementioned operating states are displayed with different colors by the mode on a mode display unit 914 simultaneously. Although the feature enlargement display screen is not shown, information displayed on the feature display screen 907 is displayed similar to the signal enlargement display screen 910.

Figure 9D:
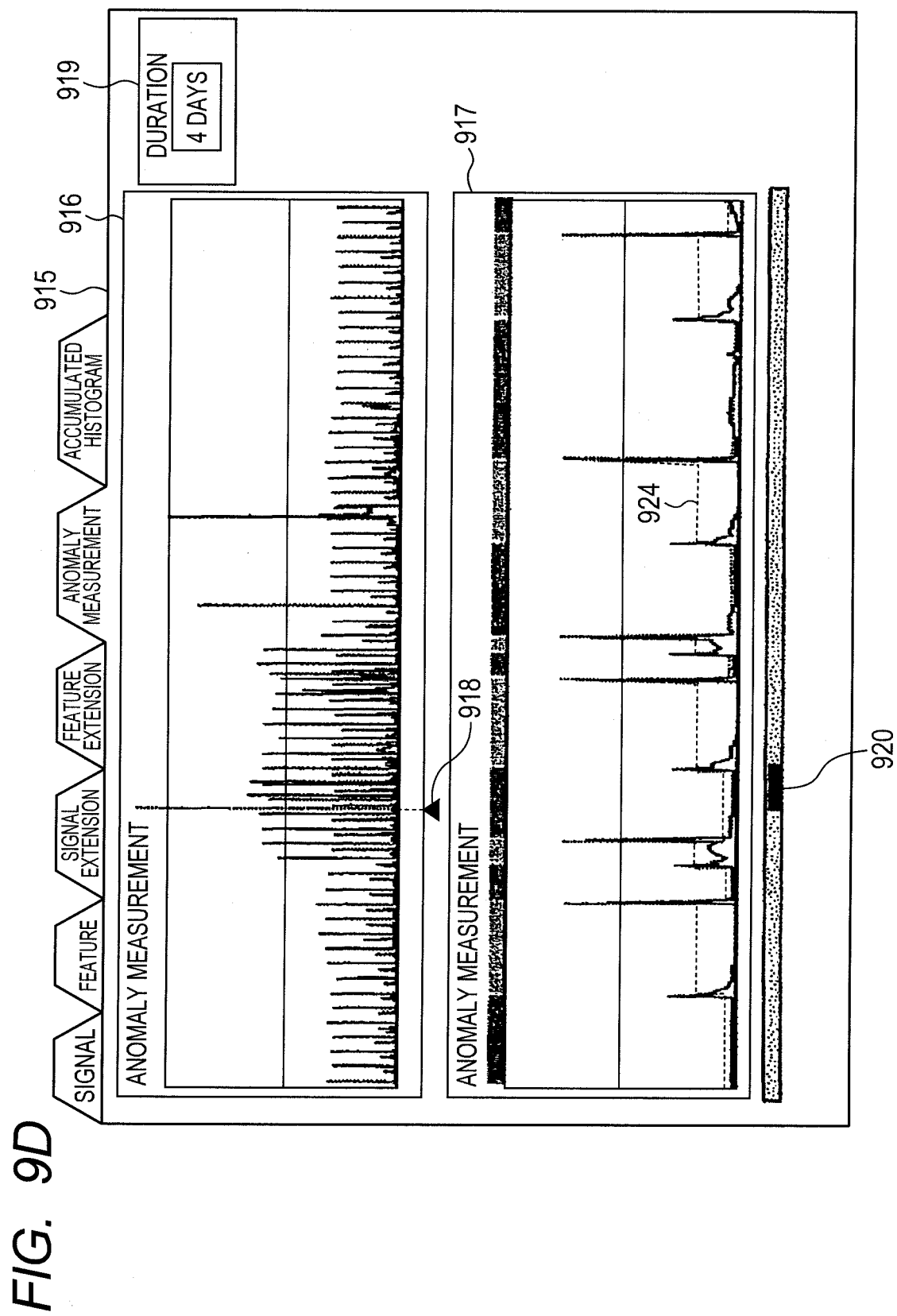
FIG. 9D is a front view of a screen displaying an anomaly measurement and an enlarged diagram of the corresponding part in an example of a display screen in checking learning data.

The anomaly measurement display screen 915 is shown in FIG. 9D. The anomaly measurement display screen 915 is constituted by an anomaly measurement display window 916 and an anomaly measurement enlargement display window 917. The anomaly measurement computed by cross-validation is displayed in the anomaly measurement display window 916. A cursor 918 is synchronized with the cursor 906 and the cursor 909 and is movable even on this screen. On the anomaly measurement enlargement display window 917, same with the signal enlargement display screen 910, an enlarged anomaly measurement is displayed at the time indicated by the cursor 918 as an origin point. A threshold 924 is overlaid on the anomaly measurement enlargement display window 917. A period designation window 919 and a scroll bar 920 also perform the same operations as those of the signal enlargement display screen 910.

Figure 9E:
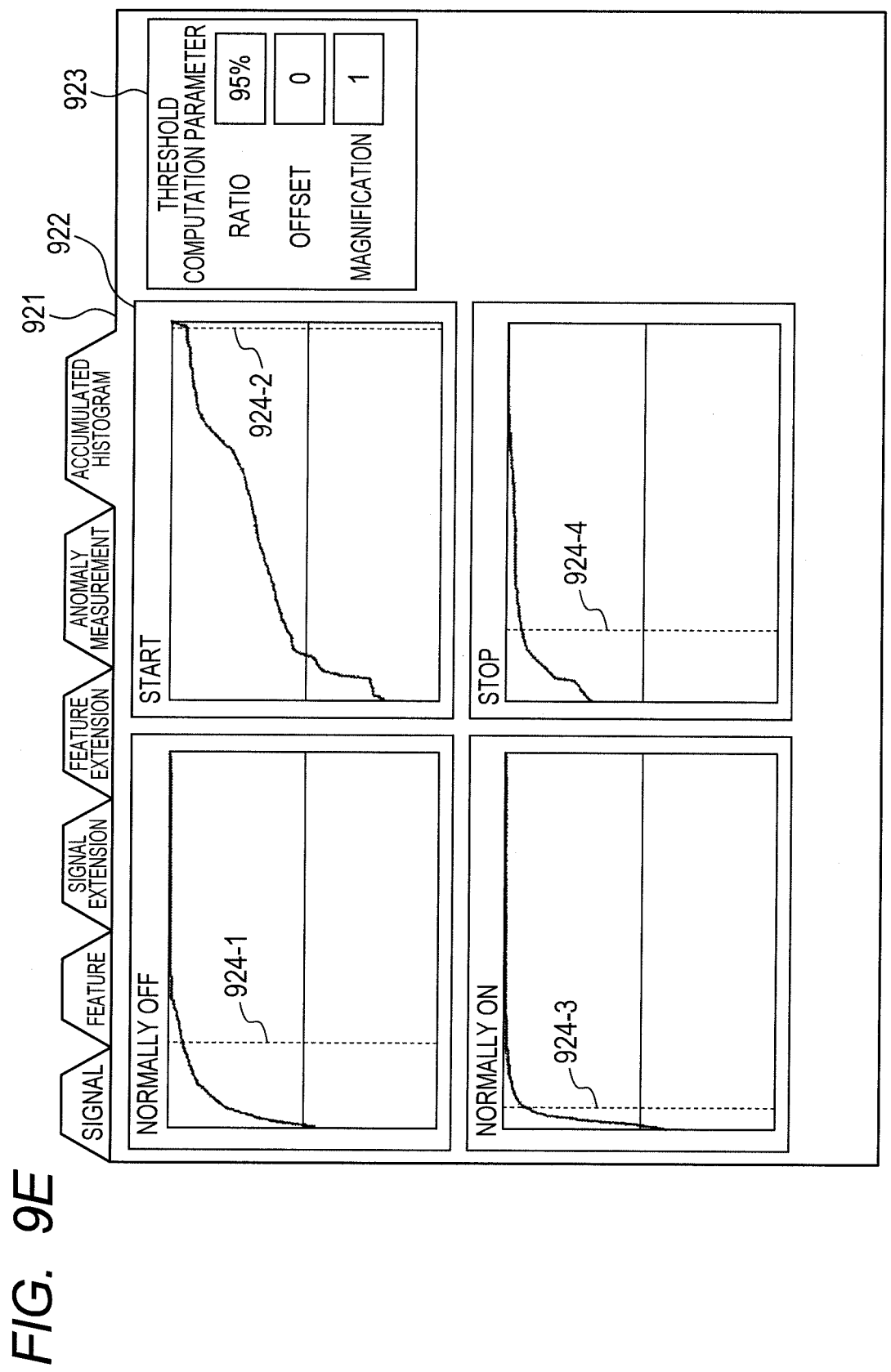
FIG. 9E is a front view of a screen displaying an accumulated histogram list of a mode for each used mode and displaying a threshold parameter next thereto in an example of a display screen in checking learning data.

An anomaly measurement accumulation histogram screen 921 is shown in FIG. 9E. The anomaly measurement accumulation histogram screen 921 includes histogram display windows 922 as many as the number of modes and a parameter display screen 923. An accumulation histogram of anomaly measurement for each mode is displayed on the histogram display window 922 and thresholds computed according to parameters displayed on the parameter display screen 923 are expressed by dotted lines 924-1 to 4. The thresholds are used to identify anomaly in the identification unit 109.

The parameters displayed on the parameter display screen 923 include the ratio for defining a reference value, the offset used for computing the thresholds, and a constant factor for magnification in the threshold computation method described as above. The parameters can be changed on the parameter display screen 923 and the thresholds displayed on the histogram display window 922 and the anomaly measurement enlargement display window 917 are changed with the change of the parameters.

Since the sensor signal, the extracted feature, the mode, the anomaly measurement, and the threshold can be visually verified by the GUI described as above, it can be judged whether the model is good or bad, and as a result, a good normal model can be created.

Subsequently, the processing in the anomaly diagnosis unit 110 will be described.

Figure 10A:
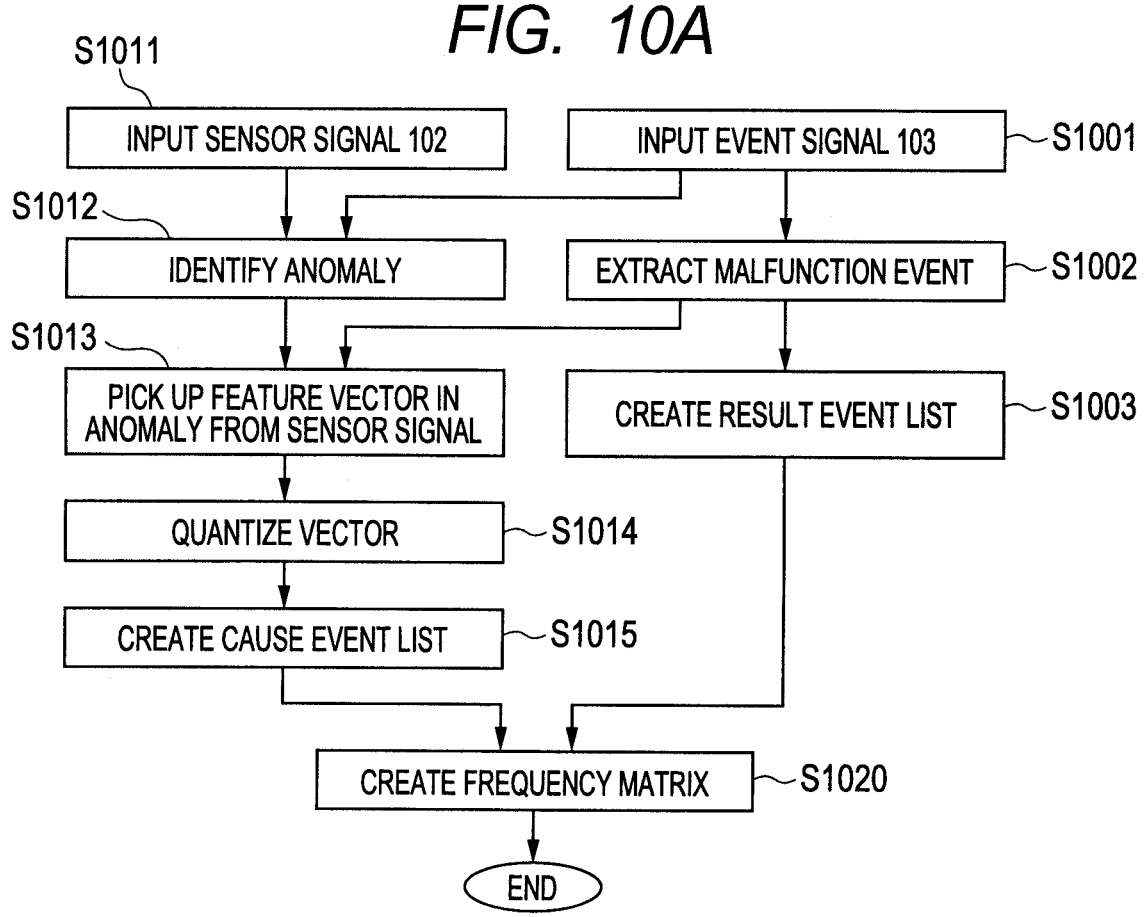
FIG. 10A is a flowchart illustrating a sequence of creating a frequency matrix.
Figure 10B:
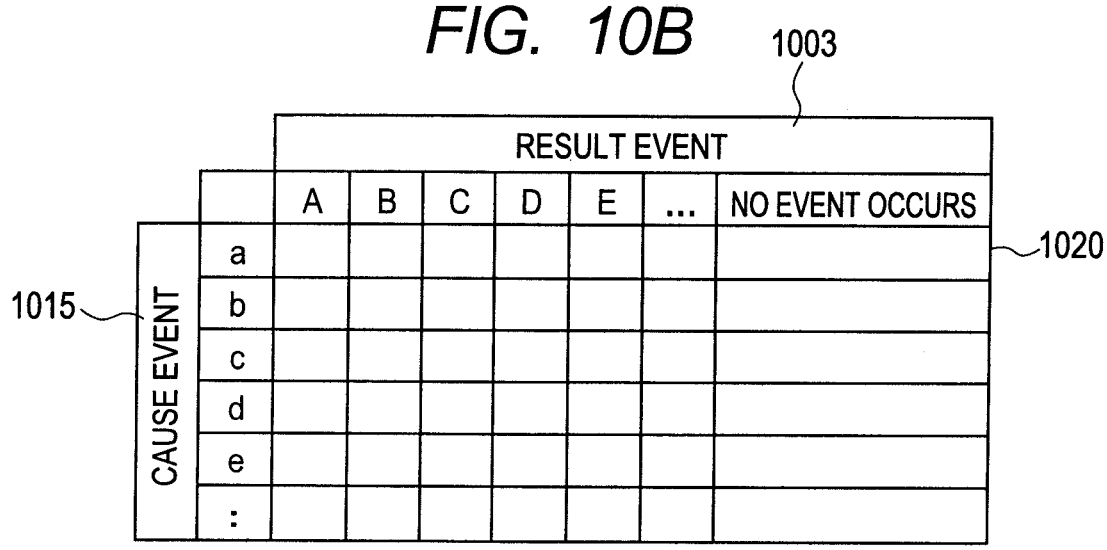
FIG. 10B is a frequency matrix table.

FIGS. 10A and 10B illustrate a causal relationship learning method in the anomaly diagnosis unit 110. First, a sequence of creating a matrix 1020 shown in FIG. 10B will be described by using a flowchart of FIG. 10A. First, a sensor signal 102 and an event signal 103 during a predetermined period are input into the anomaly diagnosis unit 110 (S1001 and S1011). Since many cases in which a failure occurs need to be learned, a period longer than the learning data for creating the normal model is required. The number of the cases may be increased by using data of plural devices. Subsequently, a failure event is extracted from the event signal 103 (S1002) to create a result event list (S1003). 'Nothing occurs' is added to the result event list.

Meanwhile, anomaly is identified according to the aforementioned anomaly identification method based on the sensor signal 102 and the event signal 103 (S1012). After the anomaly measurement is computed by the cross-validation, the anomaly identification is performed by using a threshold computed by an appropriate parameter. Alternatively, the anomaly identification is performed by using a normal model and a threshold learned by using additional data in advance. A feature vector at the time of judging anomaly is picked up (S1013) and vector-quantized by adopting an unsupervised clustering technique such as a k-means method or an EM algorithm (S1014). In the vector quantization, similar vectors are gathered and grouped and an average thereof is computed as a representative vector of the group. A label representing the group is attached to each representative vector. A list is created with the vector attached with the label as a cause event (S1015).

Subsequently, a frequency matrix 1020 with a horizontal axis representing a result event and a vertical axis representing the cause event is created (S1020). When the learning data is created by using the frequency matrix 1020, first, all elements of the matrix are reset to 0. The anomaly measurement is scanned according to a time series and an occurrence time of anomaly over the threshold is examined. The time of recognizing the casual relationship is designated in advance and the event signal 103 between the anomaly occurrence time and the passage of the designated time is examined and a failure event is extracted. The nearest representative vector is acquired from the sensor signal 102 at the anomaly occurrence time or the feature amount extracted based thereon. Crossing elements of the acquired representative vector and the extracted failure event are counted up. When no failure event is extracted, crossing elements of the representative vector and 'Nothing occurs' are counted up. This operation is performed throughout an entire designate period. Further, the frequency of each representative vector is also examined.

Figure 10C:
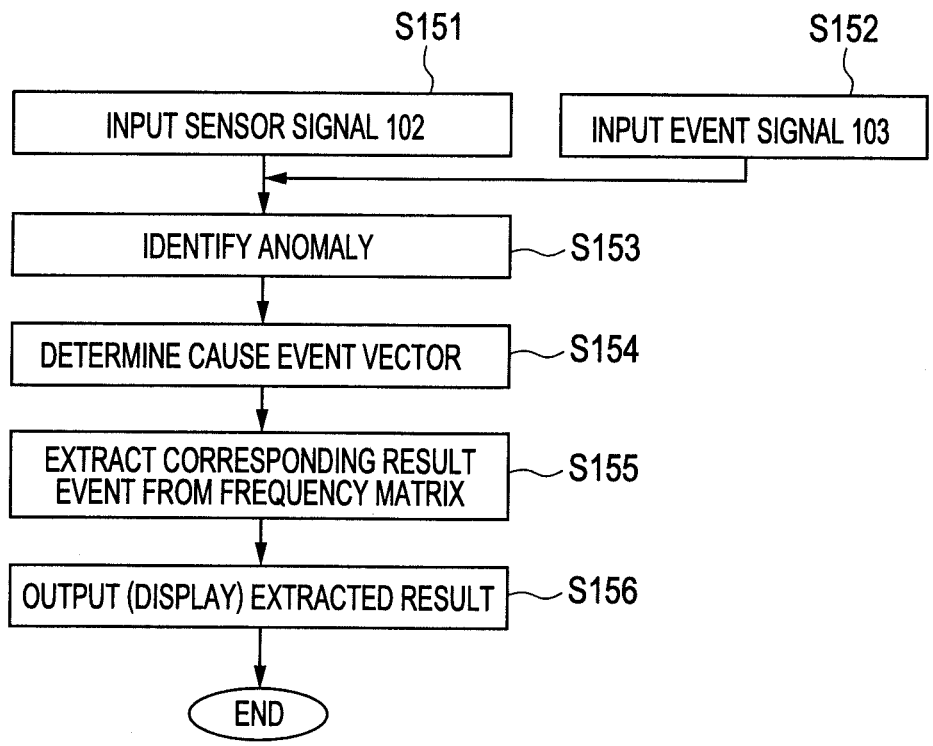
FIG. 10C is a flowchart illustrating a flow of processing in evaluation using the frequency matrix.

Subsequently, a flow of processing in evaluation will be described by using FIG. 10C. First, the sensor signal 102 is input into the feature amount extraction unit 105 (S151) and the event signal 103 is input into the mode dividing unit 104 (S152) to perform the anomaly identification by using the anomaly identification unit 109 as described above (S153). The distance between the feature vector at the time of anomaly judgment and each of the representative vectors is examined and a cause event X corresponding to the nearest vector is extracted (S154). A row on the frequency matrix 1020 corresponding to the cause event X is examined, result events Y1, Y2, Y3, etc. are extracted, in the order of a high frequency (S155), and the extracted results are presented (displayed on the screen) (S156). The presentation is an advance notice indicating that the result events may occur. Simultaneously, by dividing events including the cause event X which presents the result events Y1, Y2, Y3, etc., by the frequency of the cause event X as occurrence probabilities of the result events. Further, the frequency matrix 1005 may be updated based on data at the time when the anomaly occurs in evaluation. Further, the diagnosis processing is basically performed in real time.

In the diagnosis, it is important to present the cause event to be easily appreciated. That is, it needs to describe which state the sensor signal has the anomaly. To do so, a normal signal and an actual signal may be displayed overlapping with each other with respect to the predetermined prior and post time. For example, in the case where the anomaly measurement is computed by the projection distance method or the local sub-space classifier, coordinates (FIG. 6 and b of FIG. 7) below a vertical line in the affine partial space are displayed as the normal signal from the evaluation data. The signal is displayed as the time-series information to easily verify that the anomaly measurement is deviated from the normal state. Further, since it is considered that a signal having a large deviation when the anomaly occurs contributes to the anomaly judgment, when the signals are displayed in the order of the large deviation from the top, it is easily verified which sensor signal has the anomaly. In addition, when a past case of the cause event is displayed in the same manner as the presented result event, it is easy to accept the same phenomenon to trust the advance notice of the result event.

Accordingly, the sensor signal is quantized after the anomaly is detected based on the sensor signal 102, and as a result, information is narrowed to be used as an input of the matrix and learning the casual relationship between the events is implemented. In the learning of the casual relationship, the result events are counted up a predetermined time after the cause event occurs to extract even a casual relationship having a temporal difference and predict the failure based on the result events. That is, a prior warning of the failure can be detected.

The frequency matrix 1005 of the cause event and the result events acquired herein may be used to check the sufficiency of the learning data in addition to the diagnosis. Specifically, a signal vector having the high occurrence frequency and the high probability that 'Nothing occurs' is examined and a threshold of the case associated therewith is increased.

As described above, the prediction of the failure occurrence after the anomaly detection has been described, but the time up to the failure occurrence may be predicted by additional processing. A time difference matrix of the same cause event and result event is created when the frequency matrix 1005 is created. However, a column indicating 'Nothing occurs' is deleted. First, all elements are reset to 0. When the failure event is extracted between the anomaly occurrence time and the passage of the designated time, the passage time from the anomaly occurrence time is computed and the computed passage time is added to a crossing element of the cause event and the extracted failure event that correspond to each other. As a result, the sum of times from the occurrence of the cause event to the occurrence of the result events is computed in a case in which a predetermined result occurs due to a predetermined event. In evaluation, the cause event is specified after the anomaly is detected and the elements of the time difference matrix are divided by the frequency with respect to the result events extracted based on the frequency matrix to acquire a performance average of the time difference among the events. The presentation of the time is, i.e., the prediction of the occurrence time.

Figure 11A:
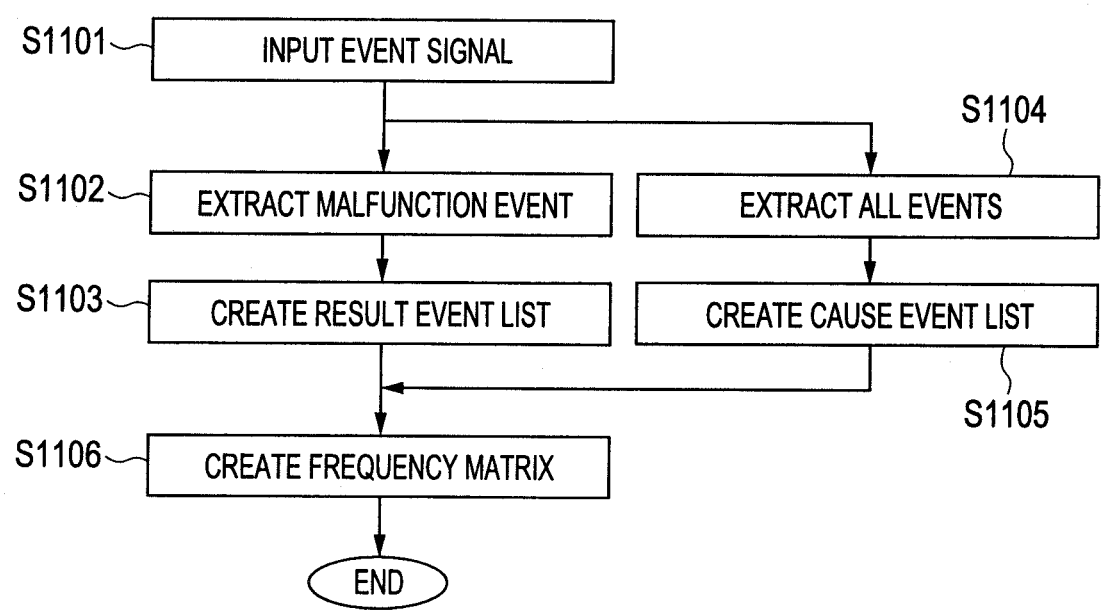
FIG. 11A is a flowchart illustrating a sequence of creating the frequency matrix by using only an event signal without using a sensor signal.

Hereinafter, as a modified example of the processing method described in FIG. 10A, an embodiment of an anomaly diagnosis method without using the sensor signal 102 will be described by using FIG. 11. FIG. 11 is a flow of anomaly diagnosis processing based on only the event signal 103. In learning, the event signal 103 during a predetermined period is input into the anomaly diagnosis unit 110 (S1101). Since many cases in which the failure occurs need to be learned, a period which is as long as possible is set. The number of the cases may be increased by using data of plural devices. Subsequently, a failure event 1001 is extracted from the event signal 103 (S1102) and a result event list is created by adding 'Nothing occurs' (S1103). Meanwhile, all kinds of events are extracted from the event signal 103 (S1104) and a cause event list is created (S1105).

Figures 11B, 12A:
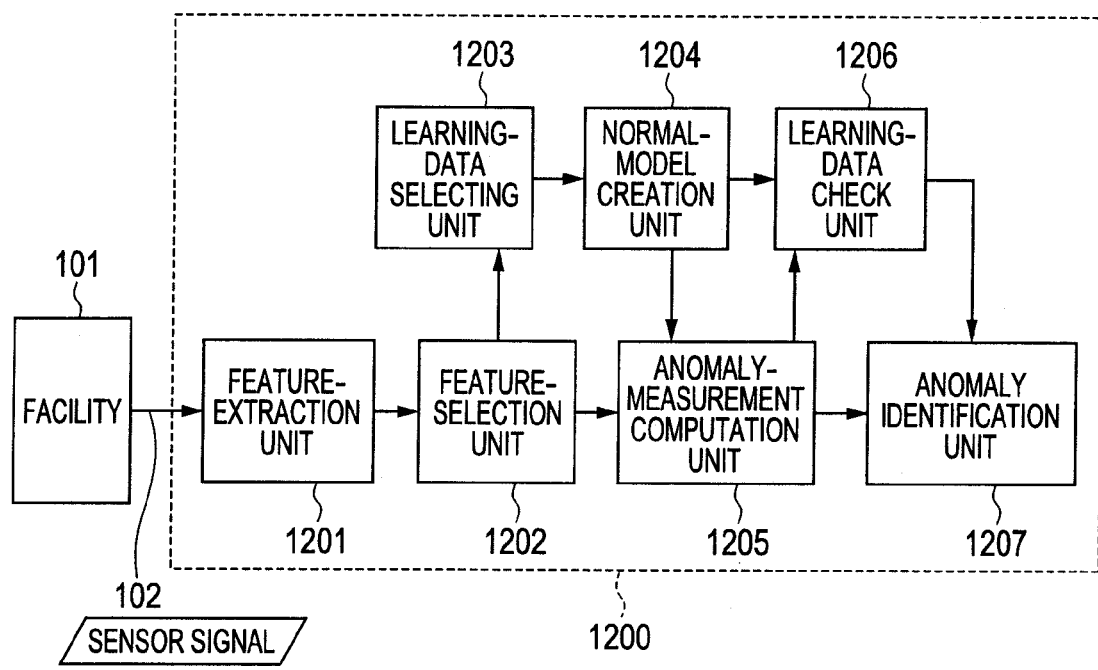
FIG. 11B is a frequency matrix table.
FIG. 12A is a block diagram illustrating a schematic configuration of a system for monitoring the state of facility of the present invention.

Subsequently, a frequency matrix 1120 with a horizontal axis representing a result event 1103 and a vertical axis representing a cause event 1115, which is shown in FIG. 11B, is created (S1106). When the learning data is created by using the frequency matrix 1120, first, all elements of the matrix are reset to 0 and the event signal 103 is sequentially processed according to the time series, similarly as the case described in FIG. 10B.

The time of recognizing the casual relationship is designated in advance and a failure event which occurs between the occurrence of a predetermined event and the passage of the designated time is extracted. Crossing events of the former event, i.e., the cause event and the extracted failure event are counted up. When no failure event is extracted, crossing elements of the cause event and 'Nothing occurs' are counted up. This processing is performed with respect to all event signals 103 which are input. Further, the frequency of each event is also examined.

In evaluation, the event signal 103 is acquired in real time and immediately processed. When the event, i.e., the cause event X occurs, a row corresponding to the frequency matrix is examined and the result events Y1, Y2, Y3, etc., are presented in the order of the high frequency together with the occurrence probability. According to the method, the occurrence of the failure may be predicted only by analyzing the event signal 103.

In the above description, the event signal is automatically output by the device, but as the result event of the frequency matrix 1005 of the cause event and the result event, an item of a problem identified in a regular check may be used together. Further, data including an image, sound, smell, vibration, and the like acquired in the regular check as the cause event may be quantized and used.

Further, when facility as a state monitoring target is a device such as an image diagnosis device, a measurement device, or a manufacturing device, which is intermittently used, data acquired in use may be the cause event or result event. For example, when the facility is the image diagnosis device, the facility is classified into a predetermined category based on a problem and image quality of the acquired image. When the facility is the measurement device, a reference material is regularly measured and the result is quantized. When the facility is the manufacturing device, the doneness of an intermediate manufacture after processing is classified into a predetermined category according to an inspection or measurement result.

Second Embodiment

FIG. 12A illustrates a configuration example of a second embodiment regarding a system that implements a method for monitoring the state of a facility of the present invention.

In this system, the sensor signal analysis unit 100 described in FIG. 1A of the first embodiment is modified into a sensor signal analysis unit 1200 shown in FIG. 12A.

The sensor signal analysis unit 1200 is configured to include a feature amount extraction unit 1201 receiving a sensor signal 102 output from facility 101 to perform feature amount extraction of the signal and acquire a feature vector, a feature-selection unit 1202 performing feature selection by receiving an output of the feature amount extraction unit 1201, a learning-data selecting unit 1203 selecting learning data to use by receiving an output of the feature-selection unit 1202, a normal-model creation unit 1204 creating a normal model by receiving an output of the learning-data selecting unit 1203, an anomaly-measurement computation unit 1205 using the normal model created by the normal-model creation unit 1204 and computing an anomaly measurement from a feature vector acquired through the feature amount extraction unit 1201 and the feature-selection unit 1202, a learning-data check unit 1206 checking the normal model based on the anomaly measurement computed by the anomaly-measurement computation unit 1205 with respect to the normal model created by the normal-model creation unit 1204, and an anomaly identification unit 1207 identifying an anomaly based on the anomaly measurement computed from data of the normal model checked by the learning-data check unit 1206 and the feature vector acquired from the sensor signal 102 through the feature amount extraction unit 1201 and the feature-selection unit 1202 by using the anomaly-measurement computation unit 1205.

Figure 12B:
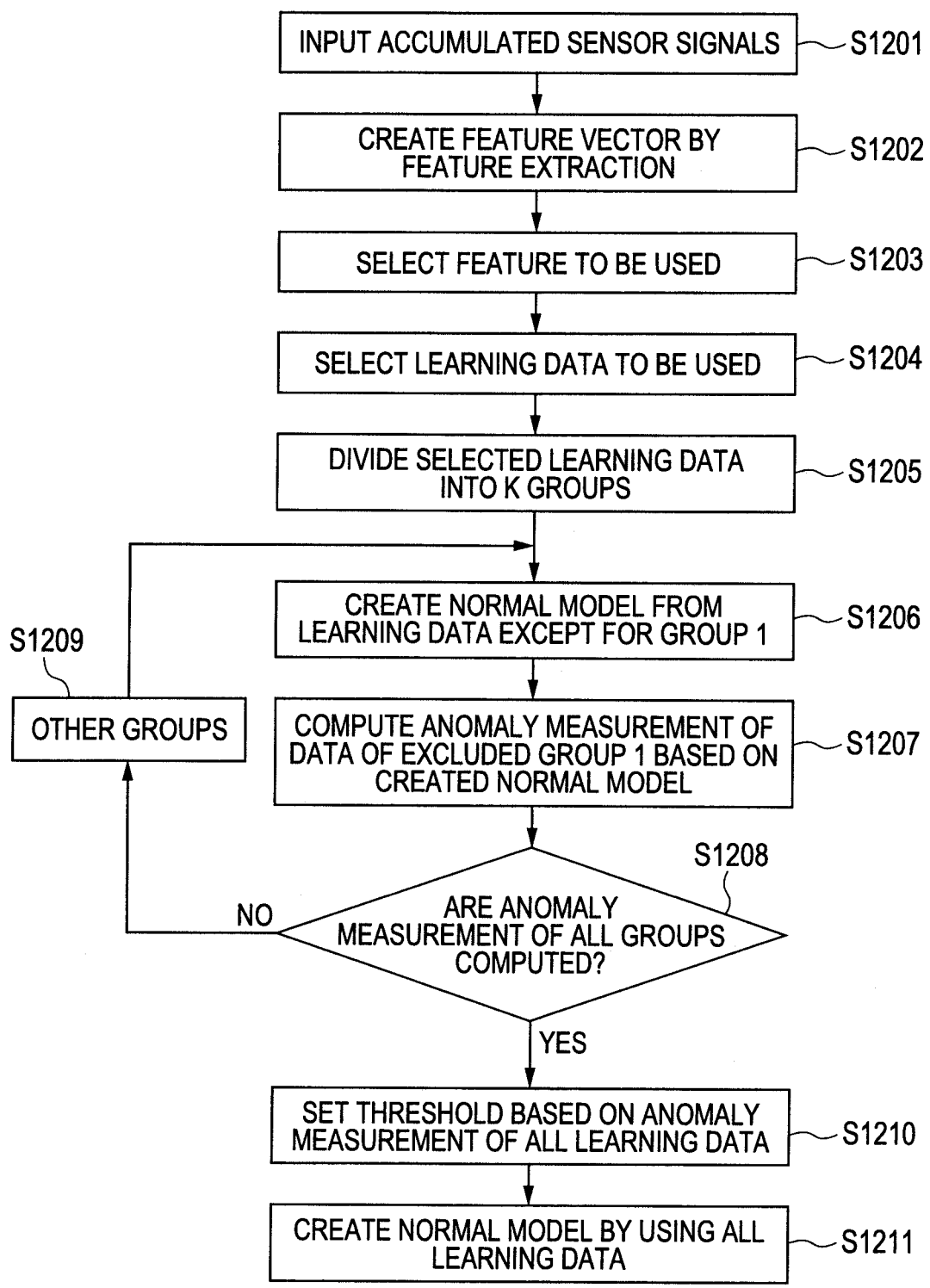
FIG. 12B is a flowchart illustrating a flow of processing in learning.

A flow of processing in learning by the system will be described by using FIG. 12B. The learning time indicates off-line processing of creating a model used for anomaly prior-warning detection in advance.

The sensor signal 102 output from the facility 101 is accumulated for learning in advance although not shown. The feature amount extraction unit 1201 inputs the accumulated sensor signal 102 (S1201) and performs feature amount extraction to acquire the feature vector (S1202).

The feature-selection unit 1202 performs data check of the feature vector output from the feature amount extraction unit 1201 and selects a feature to be used (S1203).

The learning-data selecting unit 1203 performs data check of the feature vector configured by the selected feature and selects the learning data used to create the normal model (S1204). The selected learning data is divided into k groups (S1205), the groups except for one group among them are input into the normal-model creation unit 1204 and the normal-model creation unit 1204 performs learning by using the input groups and creates the normal model (S1206).

The anomaly-measurement computation unit 1205 uses the created normal model and computes the anomaly measurement by inputting data of the one group excluded in step S1206 (S1207). If the computation of the anomaly measurement for data of all the groups is not terminated (S1208), the steps of the normal model creation (S1206) and the anomaly measurement computation (S1207) are repeated with respect to other groups (S1209). If the computation of the anomaly measurement for the data of all the groups is terminated (S1208), the process proceeds to the next step.

The learning-data check unit 1206 sets a threshold for identifying the anomaly based on the anomaly measurement computed with respect to the data of all the groups (S1209). The normal-model creation unit 1204 performs learning by using all selected learning data and creates the normal model (S1210).

Figure 12C:
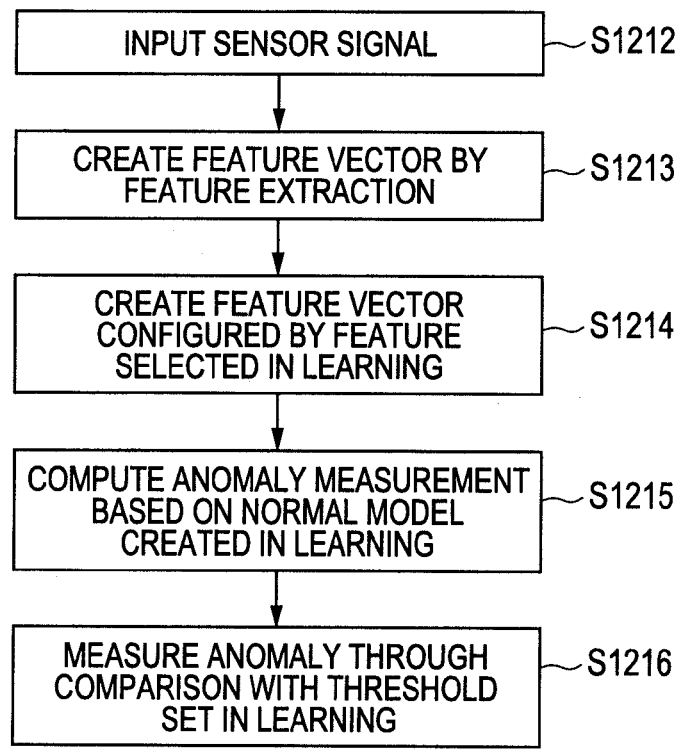
FIG. 12C is a flowchart illustrating a flow of processing when an anomaly is detected.

Subsequently, a flow of processing in evaluation by the system will be described by using FIG. 12C. The meaning of in evaluation indicates processing of performing anomaly prior-warning detection based on the model created by learning and an input signal. The processing is basically performed on-line, but the processing may be performed off-line.

The feature amount extraction unit 1201 inputs the sensor signal 102 (S1212) and performs the same feature amount extraction as that at the learning time to acquire the feature vector (S1213).

The feature-selection unit 1202 creates a feature vector configured by the feature selected in learning based on the feature vector output from the feature amount extraction unit 1201 (S1214).

The feature vector created by the feature-selection unit 1202 is input into the anomaly-measurement computation unit 1205 to compute the anomaly measurement by using the normal model created by the normal-model creation unit 1204 in learning (S1210) (S1215). The computed anomaly measurement is input into the anomaly identification unit 1207 and compared with the threshold set in learning (S1209) to perform the anomaly judgment (S1216).

Subsequently, operations of individual components shown in FIG. 12A will be described in detail sequentially.

It is considered that the feature amount extraction in the feature amount extraction unit 1201 uses the sensor signal as it is. It is considered that a window of ±1, ±2, etc., is installed with respect to a predetermined time and a feature indicating a time variation of data may be extracted by a feature vector of a window width (3.5, etc.,)×the number of sensors. Further, the feature may be resolved into a frequency component by performing discrete wavelet transform (DWT). Further, each feature may be subjected to canonicity of transforming the mean and the distribution to 0 and 1, respectively by using the mean and the standard deviation. The mean and the standard deviation of each feature are stored so as to perform the same transformation in evaluation. Alternatively, normalization may be performed by using a maximum value and a minimum value or predetermined upperlimit value and lowerlimit value.

A first example of the feature selection processing in learning, in the feature-selection unit 1202 will be described. This processing is to exclude a feature which causes the precision of the normal model to be deteriorated. In this point, it is considered that a feature in which long-time variation is large is excluded. When the feature in which the long-term variation is large is used, the number of normal states is increased and insufficient learning data is generated. Herein, since a large variation which is caused just by a difference of an operating state will occurs in most features, such feature is not a target to be excluded. Therefore, data is checked every one operating cycle of the facility to remove an influence of variation by the difference in the operating state.

Figure 13:
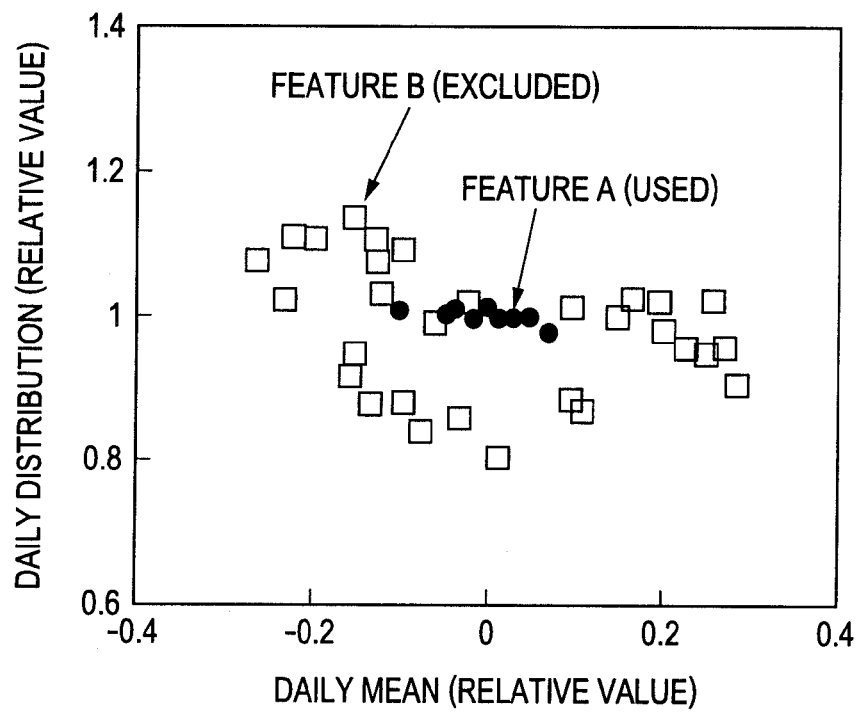
FIG. 13 is a plot diagram of daily mean and distribution.

Specifically, the mean and distribution of all the learning data are computed every one-cycle period for each feature and features having a large variation thereof are excluded. However, data during a period in which it is known in advance that the anomaly occurs is not a target to be considered. FIG. 13 illustrates an example in which the mean and distribution are computed and plotted every one day. In this example, feature A is stable in both the mean and the distribution, while since feature B is large in a variation, feature B is preferably excluded. As described above, when the operating cycle is regular, e.g., the operation starts and stops at the determined time of one day, data is extracted every fixed period, e.g., one day to compute the mean and the distribution. Although the period is not one day, the same applies thereto. When the operation starting/stopping time is known, data in a period which can be regarded as a normal operation is carried out may be extracted to compute the mean and the distribution and this method may be applied even though the operating cycle is irregular.

Subsequently, a second example of the feature selection processing in learning will be described. The second embodiment is a method in which a waveform model for one cycle is created and the number of times of deviation from the model is checked. When the operating cycle is regular, wavelengths for one cycle are superimposed for each feature with respect to all learning data. The mean $\mu(t)$ and the distribution $\sigma(t)$ of each waveform at $x_i(t)$ are computed according to the following equation and a range other than the range of $\sigma(t) \pm \sigma(t)$ is counted as the deviation.

$$\mu(t) = \frac{1}{n}\sum_{i=1}^{n} x_1(t) \quad \text{(Equation 4)}$$

$$\sigma(t) = \sqrt{\frac{1}{n}\sum_{i=1}^{n}(x_1(t))^2 - (\mu(t))^2}$$

The number of times of deviation $C_i$ of the waveform $x_i(t)$ is expressed by the following equation.

$$C_i = \sum_{t=1}^{r} \delta_1(t) \quad \text{(Equation 5)}$$

$$\delta_i(t) = \begin{cases} 0 & \text{if } |x_1(t) - \mu(t)| \leq k\sigma(t) \\ 1 & \text{else} \end{cases}$$

Figure 14:
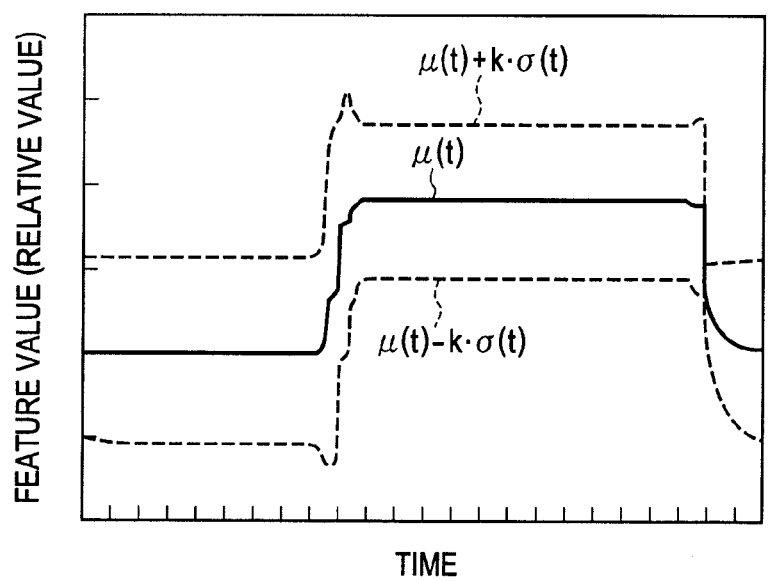
FIG. 14 is a diagram illustrating a waveform model of one day.

An example of the waveform model is shown in FIG. 14. A horizontal axis represents a time, a vertical axis represents a feature value, $\mu(t)$ is plotted by a solid line, and $\mu(t) \pm \sigma(t)$ is plotted by dotted lines.

Even though the operating cycle is irregular, when the operation starting/stopping time is known, the operation starting time and the operation stopping time are added up and thereafter, a period which can be regarded as the normal operation and a period which can be regarded as complete stop are extended and superimposed to compute the mean μ(t) and the distribution σ(t), similar to the case when an operating cycle is regular. Even at the time of examining the number of times of deviation, the waveform is extended and superimposed by adding up the operation starting time and the operation stopping time.

A feature to be excluded is generally high in the number of times of deviation. For example, when a ratio of the mean and the distribution of the number of times of deviation (mean/distribution) is low, it may be judged that the number of times of deviation is generally high. Alternatively, even when a ratio of the mean of the features acquired by excluding a predetermined number of features from the features having the higher number of times of deviation and the mean of all the features is high, it may be judged that the number of times of deviation is generally high. The judgment may be performed by an appropriate threshold by computing the mean and the distribution.

Subsequently, a third example of the feature selection processing in learning will be described by using FIGS. 15 and 16. In this example, information indicating whether the state at each time is normal or anomalistic is added to the accumulated sensor signal 102. This is a method of attaching a label indicating whether the state is normal or anomalistic to data before or after a warning or a failure occurs based on the event signal 103 although not shown.

Figure 15:
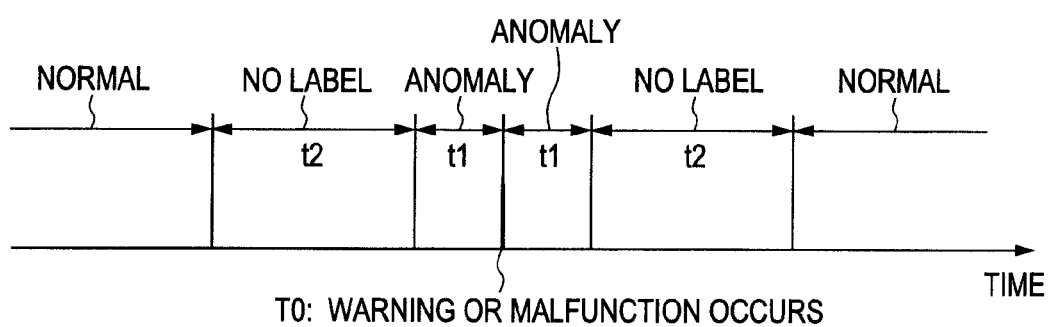
FIG. 15 is a diagram describing a method of attaching a label to data.
Figure 16:
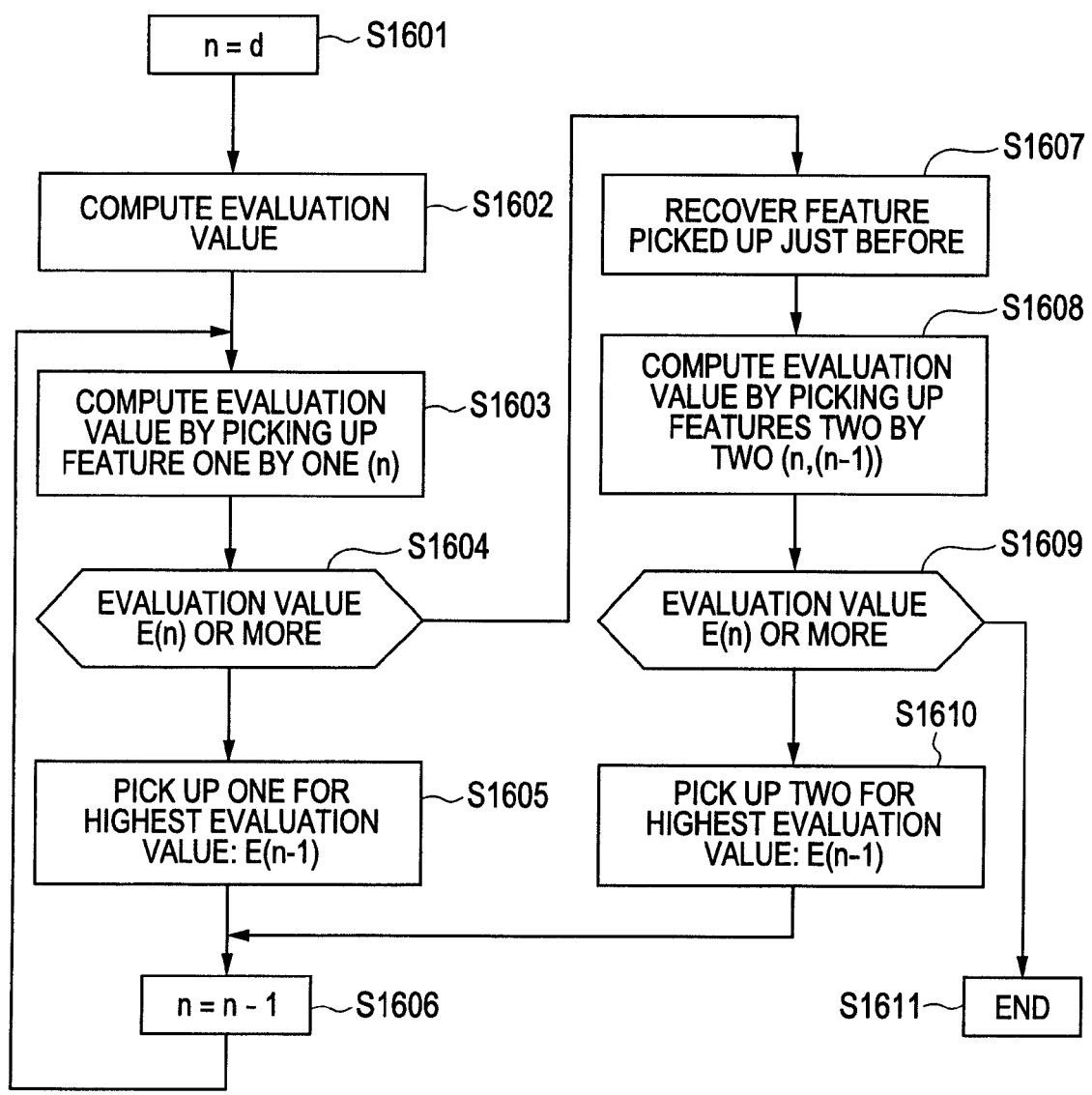
FIG. 16 is a flowchart illustrating a flow of feature selection processing in learning.

The method is shown in FIG. 15. A horizontal axis represents a time and primarily represents a time T0 at which the warning or failure occurs. The anomaly label is attached to data of a time between predetermined times t1 after or before T0. The label is not attached to a period from a time T0−t1 to t2 and a period from a time T0+t1 to t2. The normal label is attached to a period before a time T0−t1−t2 and a period after T0+t1+t2. When the warning or failure closely occurs, the label is attached based on each warning or failure occurrence time and at the time of attaching plural labels, the attachment order of the labels is determined in the priority order of anomalistic, no label, and normal. By using sensor signal data attached with the labels as described above, optimization is performed based on a maximum evaluation value.

Herein, a computation method of the evaluation value will be described below. First, the data attached with a normal label is used and the normal model is created by using the same technique as the technique used by the normal-model creation unit 1204. Further, the data attached with the normal label is divided into k groups and the normal models are created with each one group excluded. As a result, k normal models are created. Subsequently, the anomaly measurement of the data attached with the normal label is computed by using the same technique as the technique used by using the anomaly-measurement computation unit 1205 by using the normal model created as the group not including the data. A representative value Dn of the anomaly measurement of a normal part is acquired from the acquired anomaly measurement. As a method of acquiring Dn, the mean, of all data, a maximum value, a value which reaches a predetermined ratio by arraying data in an ascending order, a maximum value after adding a minimum-value filter with a predetermined width and the like are considered.

Subsequently, the anomaly measurement of the data attached with the anomaly label is computed by using the normal model created in all data attached with the normal label. A representative value Df of the anomaly measurement of an anomaly part is acquired from the acquired anomaly measurement. As a method of acquiring Df, the mean of all data attached with the anomaly label, a maximum value, a value which reaches a predetermined ratio by arraying data in an ascending order, a minimum value, a maximum value after adding a minimum-value filter with a predetermined width, a minimum value after adding a maximum-value filter with a predetermined width, the mean of data of a predetermined ratio or more by arraying data in the ascending order, and the like are considered. In order to handle plural kinds of warnings or failures, they are computed for each of the consecutive periods attached with the anomaly label and a minimum value of the computed values in all the periods is represented by Df. Lastly, a ratio of anomaly measurements of the normal part and the anomaly part (Df/Dn) is set as the evaluation value.

As an optimization technique, any one of a round-robin, a wrapper method, random selection, a gene algorithm, and the like may be used. As an example, a backward type wrapper method will be described by using FIG. 16. This is a method which starts from all features and excludes one by one feature of which evaluation values are not deteriorated in spite of exclusion.

First, the method starts from using d of all features (S1601). The number of the features in evaluation is set to n. An evaluation value E(n) is computed through the method by using n features (S1602). The features are extracted one by one to compute n evaluation values (S1603). Subsequently, it is judged whether the evaluation values which are equal to or more than E(n) exist (S1604). When the evaluation value which is equal to or more than E(n) exists, one feature is extracted so as to have the highest evaluation value and the evaluation value is set as E(n−1) (S1605). 1 is subtracted from n (S1606) and the process returns to step S1603.

When the evaluation value which is equal to or more than E(n) does not exist in step S1604, the just previously extracted feature is returned (S1607) and the features are extracted two by two to compute n×(n−1) evaluation values (S1608). It is judged whether the evaluation values which are equal to or more than E(n) exist among these evaluation values (S1609). When the evaluation value which is equal to or more than E(n) exists, two features which cause the highest evaluation value are extracted and the highest evaluation value is set as E(n−1) (S1610). 1 is subtracted from n (S1606) and the process returns to step S1603. When the evaluation value which is equal to or more than E(n) does not exist in step S1609, the process is terminated and the combination of the features is adopted (S1611).

The wrapper method also includes a forward type. This method starts from 0 and adds features having evaluation values increased one by one.

The learning data selection processing in the learning-data selection unit 1203 will be described. This processing is to exclude anomaly data which should not be used to create the normal model. Therefore, data is checked every one operating cycle of the facility to remove an influence of variation by the difference in the operating state and thereafter, data during a period which is a deviation value is removed from the learning data.

Figure 17:
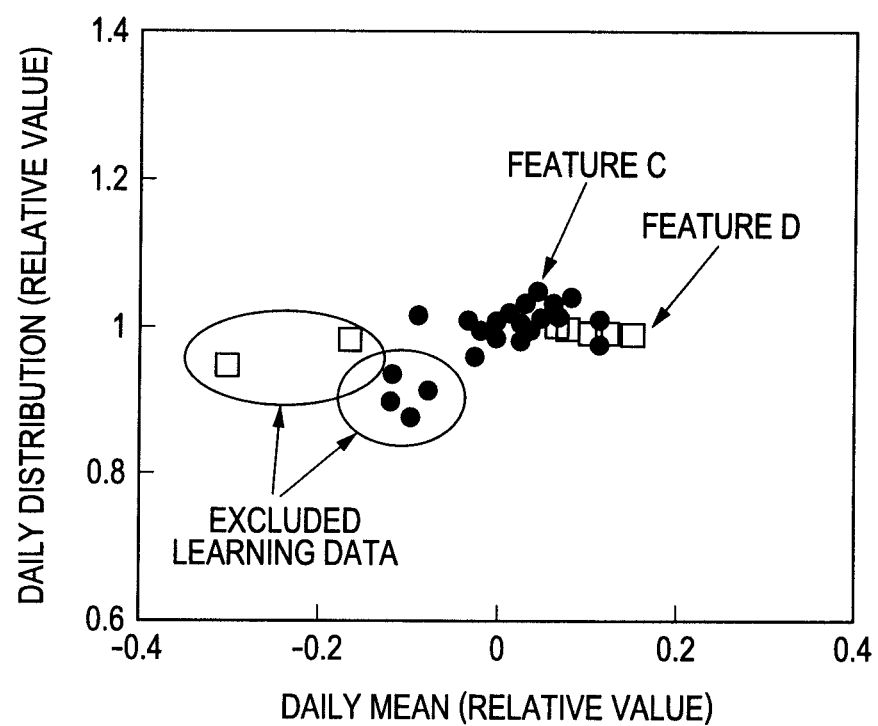
FIG. 17 is a plot diagram of daily mean and distribution.

Specifically, the mean and distribution are computed every one-cycle period for each feature for all the learning data and the deviation value is found to remove data during a period corresponding to the deviation value. FIG. 17 illustrates an example in which the mean and distribution are computed and plotted every one day. Two kinds of features are plotted and data surrounding features C and D with circles, respectively are deviation values. In order to find the deviation values, hierarchical clustering is performed based on a distance and data isolated in 1 or small number are found.

Besides, a method in which a waveform model for one cycle is created and the number of times of deviation from the model is checked is also considered. In the same method as the second example of the feature selection, the mean $\mu(t)$ and the distribution $\sigma(t)$ are computed and a range other than the range of $\mu(t) \pm k\sigma(t)$ is counted as the deviation. The mean of the number of times of deviation is computed for each feature and when the number of times of deviation for one cycle is compared with and is extremely larger than (e.g., several times more than) the mean with respect to a predetermined feature, data during the corresponding period is removed. Alternatively, the number of features in which the number of times of deviation for one cycle is more than the mean is counted and data during a period having the large number of deviation times is removed.

Figure 18:
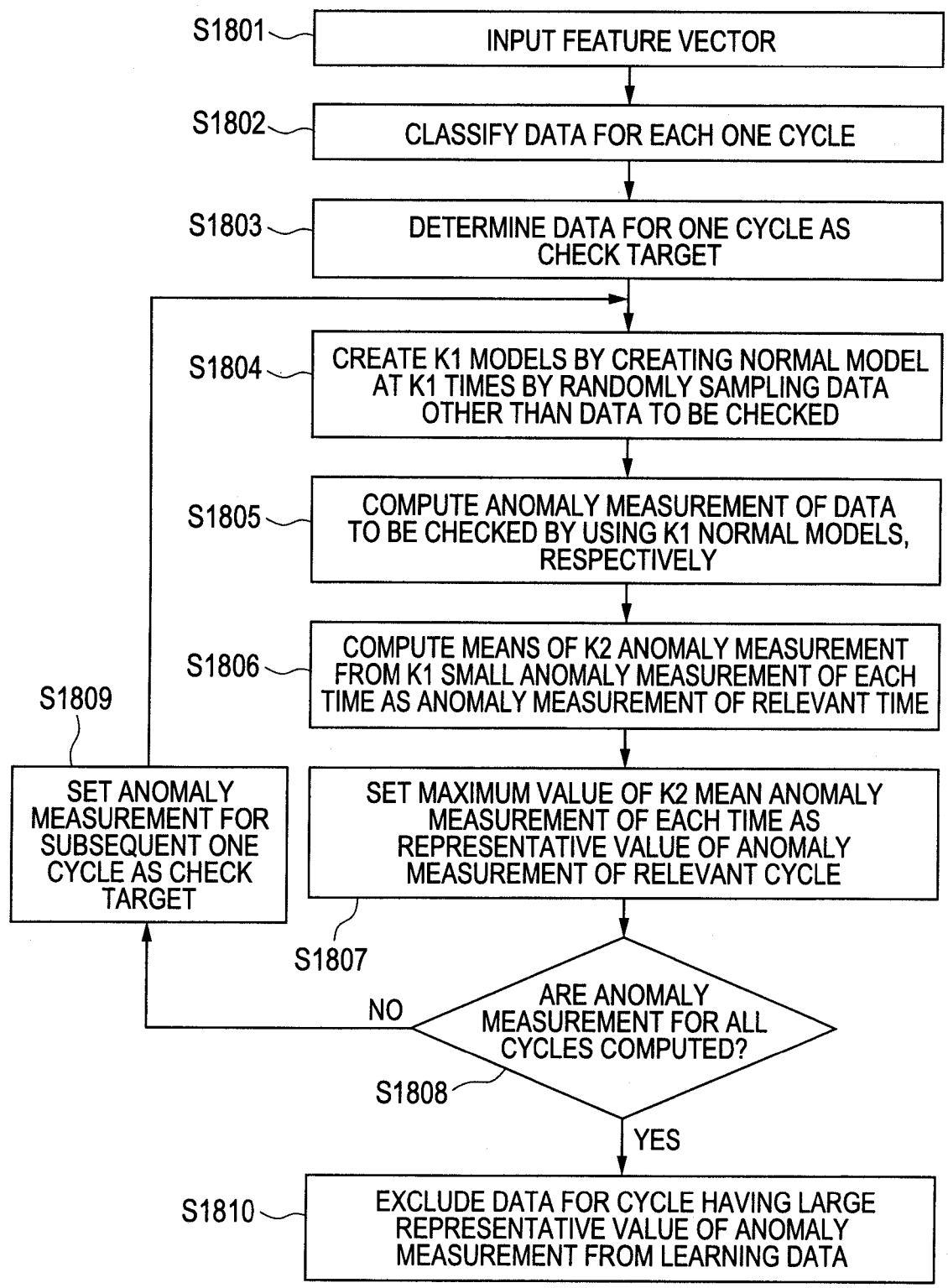
FIG. 18 is a flowchart illustrating a flow of learning data selection processing in learning.

Another example of the learning data selection processing in the learning-data selection unit 1203 will be described by using FIG. 18. First, the feature vector configured by the selected feature which is output from the feature-selection unit 1202 is input (S1801). Subsequently, input data is isolated every one cycle of the operating cycle (S1802). When the operating cycle is unclear, a unit which is easy to handle, such as every day may be used.

Subsequently, data for one cycle are determined as a check target (S1803) and the normal model is created by randomly sampling data for several cycles from data other than the check target and repeatedly performing this process k1 times for k1 check target to create k1 models (S1804). The normal model creation technique is the same as the technique used in the normal-model creation unit 1204. Anomaly measurements of the check targets are computed by using k1 normal models, respectively (S1805). As a result, k1 anomaly measurements are computed at each time. Subsequently, k2 anomaly measurements from the smallest are selected among the k1 anomaly measurements at each time to compute the mean, which is set as the anomaly measurement of the corresponding time (S1806).

A maximum value of the means of the computed anomaly measurements during one cycle is acquired and set as a representative value of the anomaly measurements during the cycle (S1807). When computation of the representative value is not terminated with respect to all cycles (S1808), data of the next cycle is determined as the check target (S1809). Then, the processing from step S1804 is repeated. When the computation is terminated, data of a cycle having the large representative value of the anomaly measurement is excluded from the learning data (S1810).

In the example, plural normal models are created by random sampling, and as a result, it is expected that several models are created as data not including the anomaly even though the anomaly state is mixed into data. When the check target is normal, the anomaly measurement computed by using the model created as the normal data is small, and as a result, the mean of several anomaly measurements selected from the smallest is small. When the check target is anomalistic, the anomaly measurement computed by using a model created as data including the same anomaly is small. But, when using several models, there is scarcely a case that all the models include the anomaly. Therefore, the anomaly measurement increases when the means is acquired. Under the assumption that the rate of mixed anomaly is low, anomalistic data may be excluded by this method.

According to the method described above, the feature and the learning data which are used may be automatically selected based on data check of the feature vector. As a result, the user may create a high-precision normal model only by inputting the whole sensor signals without looking over the used feature and learning data and high-sensitive anomaly detection is implemented with a minimum effort.

Further, in the example shown in FIG. 12A, only the sensor signal is used, but like the embodiment shown in FIG. 1A, the configuration in which the event signal is input, mode dividing is performed based thereon, and the normal model is created for each mode and the threshold is set by checking sufficiency of the learning data is also included in the present invention.

In this case, it is considered that the event signal is used even in selection processing the learning data in the learning-data selection unit 1203. Hereinafter, an example of the selection processing of the learning data using the event signal will be described. A basic policy is to judge whether an anomaly state will be included as a predetermined basic unit based on the event signal and, if included, remove the anomaly state from the learning data by the basic unit including the anomaly state. The predetermined basic unit is, e.g., one day. This is determined from the two viewpoints of including various operating states and removing the influence of the anomaly state with much time to spare.

The condition of judging the anomaly is, for example, as follows. The condition includes (1) occurrence of the failure or warning event, (2) including an anomalistic start sequence, (3) difference from others in the number of start sequences, (4) difference from others in the interval between the start sequence and the stop sequence, and (5) occurrence of an event or an event array having a low frequency. Checking (1) may only retrieve the failure/warning from the event signal to examine the time and date thereof. In order to check (2), (3), and (4), the start sequence and the stop sequence are extracted according to the method described by using FIG. 2 and it is judged whether the extracting sequences are normal.

The normal sequence stops in a predetermined stop event. When the sequence stops in the failure or warning event or a start event of a predetermined sequence, the sequence is judged as the anomaly sequence. Further, it is judged whether the sequence is normal or anomalistic based on a knowledge regarding the normal sequence such as the number of predetermined events, the order of the events, and the like among the sequences. In order to check (5), the frequency of the event or event array is examined in advance. However, the frequency of the event array may be counted to be the same as that of the similar event array according to the method shown in FIG. 3.

Third Embodiment

Figure 19:
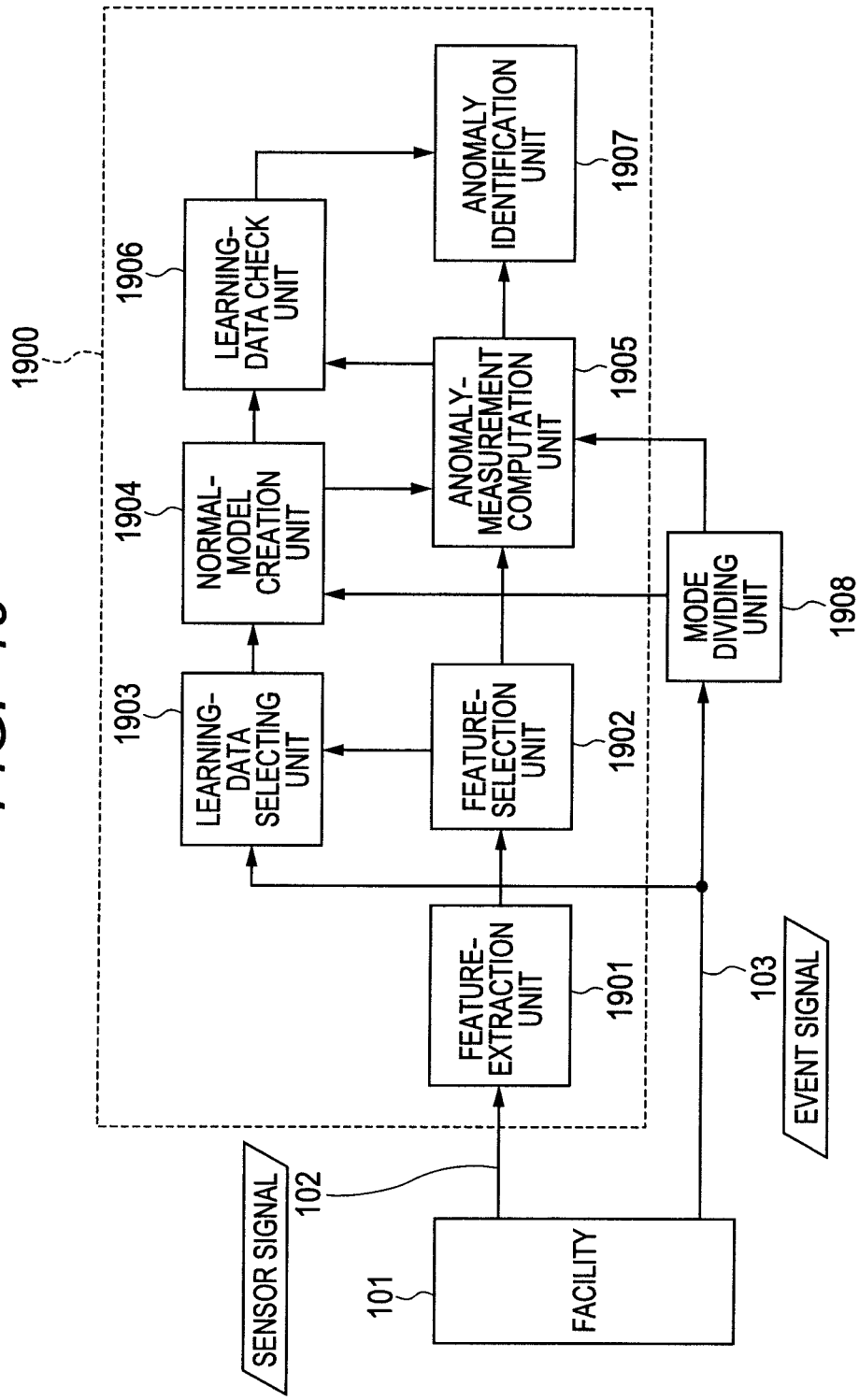
FIG. 19 is a block diagram illustrating a schematic configuration of a system for monitoring the state of facility in a third embodiment.

FIG. 19 illustrates one configuration example of a system that implements a method for monitoring the state of facility in the third embodiment.

The system monitoring the state of the facility of the embodiment is implemented by combining a sensor-signal analysis unit 1900 corresponding to the sensor signal analysis unit 1200 of FIG. 12 described in the second embodiment and a mode dividing unit 1908 corresponding to the mode dividing unit 104 described in the first embodiment.

The system is configured to include the sensor signal analysis unit 1900 including a feature amount extraction unit 1901 that receives a sensor signal 102 output from facility 101 to perform feature amount extraction of the signal and acquires a feature vector, a feature-selection unit 1902 performing feature selection by receiving an output of the feature amount extraction unit 1901, a learning-data selecting unit 1903 selecting learning data to be used by receiving the event signal 103 output from the facility 101 and an output of the feature-selection unit 1902, a normal-model creation unit 1904 creating a normal model by receiving an output of the learning-data selecting unit 1903, an anomaly-measurement computation unit 1905 using the normal model created by the normal-model creation unit 1904 and computing an anomaly measurement from the feature vector acquired through the feature amount extraction unit 1901 and the feature-selection unit 1902, a learning-data check unit 1906 checking the normal model based on the anomaly measurement computed by the anomaly-measurement computation unit 1905 with respect to the normal model created by the normal-model creation unit 1904, and an anomaly identification unit 1907 identifying an anomaly based on the anomaly measurement computed from data of the normal model checked by the learning-data check unit 1906 and the feature vector acquired from the sensor signal 1905 through the feature amount extraction unit 1901 and the feature-selection unit 1902 by using the anomaly-measurement computation unit 1905, and the mode dividing unit 1908 dividing the time according to the variation in the operating state of the facility 101 by receiving the event signal 103 output from the facility 101.

A flow of processing in learning by the system will be described.

The sensor signal 102 output from the facility 101 is accumulated for learning in advance. The feature amount extraction unit 1901 inputs the accumulated sensor signal 102 and performs feature amount extraction to acquire the feature vector. The feature-selection unit 1902 performs data check of the feature vector output from the feature amount extraction unit 1901 and selects a feature to be used. The learning-data selecting unit 1903 performs data check of the feature vector configured by the selected feature and check of the event signal 103 and selects the learning data used to create the normal model.

Meanwhile, the mode dividing unit 1908 performs mode dividing of dividing the time for each operating state based on the event signal 103. The selected learning data are divided into k groups, the groups except for one group among them are input into the normal-model creation unit 1904 and the normal-model creation unit 1904 performs learning by using the input groups and creates the normal model. In the case of some normal model types, the normal model is created for each mode.

The anomaly-measurement computation unit 1905 uses the created normal model and computes the anomaly measurement by inputting data of the one group excluded in creating the normal model. If the computation of the anomaly measurement for data of all the groups is not terminated, the normal model creation and the anomaly measurement computation are repeated with respect to other groups. If the computation of the anomaly measurement for the data of all the groups is terminated, the process proceeds to the next step. The learning-data check unit 1906 sets a threshold for identifying the anomaly for each mode based on the anomaly measurement computed with respect to the data of all the groups.

The normal-model creation unit 1904 performs learning by using all selected learning data and creates the normal model.

Subsequently, a flow of processing in evaluation by the system will be described.

The feature amount extraction unit 1901 inputs the sensor signal 102 and performs the same feature amount extraction as that at the learning time to acquire the feature vector. The feature-selection unit 1902 creates the feature vector configured by the feature selected in learning based on the feature vector output from the feature amount extraction unit 1901. The feature vector created by the feature-selection unit 1902 is input into the anomaly-measurement computation unit 1905 to compute the anomaly measurement by using the normal model created by the normal-model creation unit 1904 in learning.

When the normal model is created for each mode, the anomaly measurement is computed by using the normal models of all the modes and the minimum value is acquired. Meanwhile, the mode dividing unit 1908 performs mode dividing of dividing the time for each operating state based on the event signal 103. The computed anomaly measurement is input into the anomaly identification unit 1907 and compared with the threshold for the corresponding mode among the thresholds for each mode set in learning to judge the anomaly.

Subsequently, operations of individual components shown in FIG. 19 will be described in detail sequentially.

Figure 3:
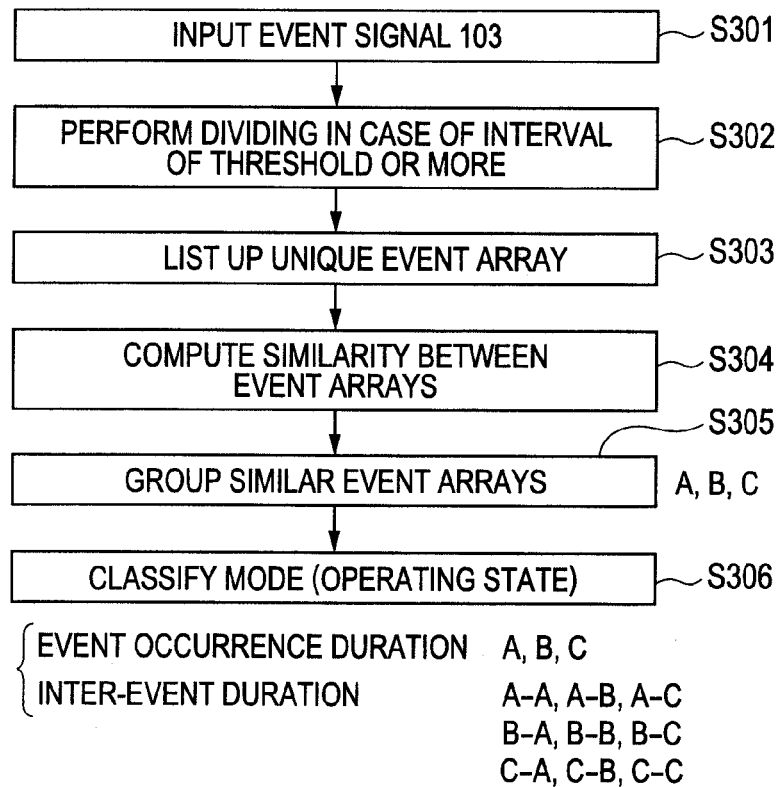
FIG. 3 is a flowchart describing a flow of processing of a second embodiment of a mode dividing method based on event information.

The mode dividing method in the mode dividing unit 1908 is the same as the method described by using FIGS. 2 and 3.

The operations in the feature amount extraction unit 1901 and the feature-selection unit 1902 are the same as the example described by using FIG. 12.

In the learning data selection processing in the learning-data selection unit 1903, the method using the event signal is considered in addition to the same method as the example described by using FIG. 12. An example of the learning data selection processing using the event signal will be described. A basic policy is to judge whether an anomaly state will be included as a predetermined basic unit based on the event signal and, if included, remove the anomaly state from the learning data by the basic unit including the anomaly state. The predetermined basic unit is, e.g., one day. This is determined from the two viewpoints of including various operating states and removing the influence of the anomaly state with much time to spare.

The condition of judging the anomaly is, for example, as follows. The condition includes (1) occurrence of the failure or warning event, (2) including an anomalistic start sequence, (3) difference from others in the number of start sequences, (4) difference from others in the interval between the start sequence and the stop sequence, and (5) occurrence of an event or an event array having a low frequency. Checking (1) may only retrieve the failure/warning from the event signal to examine the time and date thereof. In order to check (2), (3), and (4), the start sequence and the stop sequence are extracted according to the method described by using FIG. 2 and it is judged whether the extracted sequences are normal.

The normal sequence stops in a predetermined stop event and when the sequence stops in the failure or warning event or a start event of a predetermined sequence, the sequence is judged as the anomaly sequence. Further, it is judged whether the sequence is normal based on a knowledge regarding the normal sequence such as the number of predetermined events, the order of the events, and the like among the sequences. In order to check (5), the frequency of the event or event array is examined in advance. However, the frequency of the event array may be counted to be the same as that of the similar event array according to the method shown in FIG. 3.

The normal model creating method processed by the normal-model creation unit 1904 is the same as the method described by using FIGS. 5 to 7.

The anomaly measurement computation method processed by the anomaly-measurement computation unit 1905 is the same as the method described by using FIGS. 6 and 7.

The learning data check method processed by the learning-data check unit 1906 is the same as the method described by using FIGS. 8 and 9.

INDUSTRIAL APPLICABILITY

The present invention can be used in a method and a device for monitoring the state that even in a turbine in a hydroelectric plant, a nuclear reactor in a nuclear power plant, a windmill of a wind power plant, an engine of an aircraft or a heavy machine, a railroad vehicle or a track, an escalator, an elevator, and an apparatus/component level in addition to a gas turbine or a stream turbine, facilities such as the deterioration/lifespan of mounted batteries are numerous, diagnose a phenomenon by detecting an anomaly early based on multi-dimensional time-series data output from various facilities.

REFERENCE SIGNS LIST

101 . . . Facility
102 . . . Sensor signal
103 . . . Event signal
104 . . . Mode dividing unit
105 . . . Feature amount extraction unit
106 . . . Normal-model creation unit
107 . . . Anomaly-measurement computation unit
108 . . . Learning-data check unit
109 . . . Anomaly identification unit
110 . . . Anomaly diagnosis unit
1201 . . . Feature amount extraction unit
1202 . . . Feature-selection unit
1203 . . . Learning-data selecting unit
1204 . . . Normal-model creation unit
1205 . . . Anomaly-measurement computation unit
1206 . . . Learning-data check unit
1207 . . . Anomaly identification unit

The invention claimed is:

1. A method for monitoring the state of facility that detects an anomaly based on a time-series sensor signal output from the facility or an apparatus, comprising:
a learning process of extracting a feature vector based on the sensor signal, selecting a feature to be used based on data check of the feature vector, selecting learning data to be used based on data check of the feature vector, creating a normal model based on the selected learning data, checking sufficiency of the learning data used for creating the normal model, and setting a threshold in accordance with the sufficiency of the learning data; and
an anomaly detecting process of extracting the feature vector based on the sensor signal, computing an anomaly measurement through the comparison between the normal model and the feature vector, and identifying the anomaly through the comparison between the anomaly measurement and the threshold.

2. The method for monitoring the state of facility according to claim 1, wherein the data check in selecting the feature and selecting the learning data is performed based on the mean and distribution for one operating cycle for each feature of the feature vector.

3. The method for monitoring the state of facility according to claim 2, wherein the feature is selected by inputting information on a warning or failure time of the facility or apparatus, adding a normal or anomaly label to the feature vector based on the information on the warning or failure time, and retrieving a combination of features based on the case in which a ratio of an anomaly measurement of the feature vector added with the anomaly label to an anomaly measurement of the feature vector added with the normal label is the maximum.

4. The method for monitoring the state of facility according to claim 2, wherein the learning data is selected by creating a plurality of normal models by random sampling from data other than data of a target cycle for each one operating cycle with respect to all learning data, computing a plurality of anomaly measurements of the data of the target cycle by using all the plurality of normal models, computing the predetermined number of means from the plurality of anomaly measurements of each data, acquiring a maximum value of the mean during the target cycle, and excluding data of a cycle in which the maximum value of the mean is larger than a predetermined threshold, from the learning data.

5. The method for monitoring the state of facility according to claim 1, wherein the data check in selecting the feature and selecting the learning data is performed based on the number of times of deviation from a waveform model for one operating cycle for each feature of the feature vector.

6. The method for monitoring the state of facility according to claim 5, wherein the feature is selected by inputting information on a warning or failure time of the facility or apparatus, adding a normal or anomaly label to the feature vector based on the information on the warning or failure time, and retrieving a combination of features based on the case in which a ratio of an anomaly measurement of the feature vector added with the anomaly label to an anomaly measurement of the feature vector added with the normal label is the maximum.

7. The method for monitoring the state of facility according to claim 5, wherein the learning data is selected by creating a plurality of normal models by random sampling from data other than data of a target cycle for each one operating cycle with respect to all learning data, computing a plurality of anomaly measurements of the data of the target cycle by using all the plurality of normal models, computing the predetermined number of means from the plurality of anomaly measurements of each data, acquiring a maximum value of the mean during the target cycle, and excluding data of a cycle in which the maximum value of the mean is larger than a predetermined threshold, from the learning data.

8. A method for monitoring the state of facility that detects an anomaly based on a time-series sensor signal and an event signal output from the facility or an apparatus, comprising:
a learning process of dividing a mode for each operating state based on the event signal, extracting a feature vector based on the sensor signal, selecting a feature to be used based on data check of the feature vector, selecting learning data to be used based on data check of the feature vector, creating a normal model for each mode based on the selected learning data, checking sufficiency of the learning data used for creating the normal model for each mode, and setting a threshold in accordance with the sufficiency of the learning data; and
an anomaly detecting process of dividing the mode for each operating state based on the event signal, extracting the feature vector based on the sensor signal, computing an anomaly measurement by comparing the feature vector with the normal model, and identifying the anomaly by comparing the threshold with the anomaly measurement.

9. The method for monitoring the state of facility according to claim 8, wherein the learning data is selected by acquiring information on a warning or failure, information on start and stop sequences, and information on occurrence of an event or event array having a low frequency, based on the event signal and determining exclusion by the predetermined basic unit based on the acquired information.

10. A method for monitoring the state of facility that detects an anomaly based on a time-series sensor signal and an event signal output from the facility or an apparatus, comprising:
a learning process of dividing a mode for each operating state based on the event signal, extracting a feature vector based on the sensor signal, creating a normal model for each mode based on the feature vector, checking sufficiency of the learning data used for creating the normal model for each mode, and setting a threshold in accordance with the sufficiency of the learning data; and an anomaly detecting process of dividing the mode for each operating state based on the event signal, extracting the feature vector based on the sensor signal, computing an anomaly measurement by comparing the feature vector with the normal model, and identifying the anomaly by comparing the threshold with the anomaly measurement.

11. The method for monitoring the state of facility according to claim 10, wherein in the learning process, the feature vector at the time when the anomaly is judged by the anomaly identification is quantized to be set as a cause event and a failure event which occurs from the time of the anomaly judgment to the passage of a predetermined time is set as a result event, and a frequency matrix of a combination of the cause event and the result event is created, and in the anomaly detecting process, the occurrence of the result event is predicted based on the frequency matrix created in the learning process and the feature vector at the time when the anomaly is judged by the anomaly identification.

12. The method for monitoring the state of facility according to claim 11, wherein at the time of predicting the occurrence of the result event, a normal sensor signal computed based on the normal model and the feature vector and an actual sensor signal are overlapped and displayed with respect to a predetermined time before or after the anomaly judgment.

13. The method for monitoring the state of facility according to claim 11, wherein at the time of predicting the occurrence of the result event, a normal sensor signal computed based on the normal model and the feature vector and an actual sensor signal are overlapped and displayed with respect to learning data in which the predicted result event and an input cause event coincide with each other.

14. A method for monitoring the state of facility, comprising:

mode-dividing a time-series event signal output from the facility or an apparatus in accordance with an operating state of the facility or apparatus;

acquiring a feature vector from a time-series sensor signal output from the facility or apparatus;

creating a normal model for each divided mode by using the mode dividing information and information on the feature vector acquired from the sensor signal;

computing an anomaly measurement of the feature vector for each divided mode by using the created normal model;

judging an anomaly by comparing the computed anomaly measurement with a predetermined threshold; and diagnosing whether the facility or apparatus is anomalistic by using the judged anomaly information and the sensor signal.

15. The method for monitoring the state of facility according to claim 14, wherein in the normal model creating process, learning data is selected from the acquired feature vector for each divided mode, and the normal model is acquired by using the learning data selected for each mode.

16. The method for monitoring the state of facility according to claim 15, further comprising:

a process of checking sufficiency of the learning data for each selected divided mode, wherein a threshold of an anomaly measurement for judging the anomaly is set for each divided mode in accordance with a result of checking the sufficiency of the learning data for each divided mode in the process.

17. The method for monitoring the state of facility according to claim 15, wherein the computed anomaly measurement and the set threshold of the anomaly measurement are displayed on a screen.

18. A device for monitoring the state of facility, comprising:

a mode dividing means inputting a time-series event signal output from the facility or an apparatus to mode-divide the event signal in accordance with an operating state of the facility or apparatus;

a feature-vector computation means inputting the time-series sensor signal output from the facility or apparatus to acquire a feature vector from the input sensor signal;

a normal-model creation means creating a normal model for each divided mode by using the mode dividing information from the mode dividing means and information on the feature vector of the sensor signal acquired by the feature-vector computation means;

an anomaly-measurement computation means computing an anomaly measurement of the feature vector acquired by the feature-vector computation means for each divided mode by using the normal model created by the normal-model creation means;

an anomaly judgment means judging an anomaly by comparing the anomaly measurement computed by the anomaly measurement computation means with a predetermined threshold; and an anomaly diagnosis means diagnosing whether the facility or apparatus is anomalistic by using the information on the anomaly judged by the anomaly judgment means and the time-series sensor signal output from the facility or apparatus.

19. The device for monitoring the state of facility according to claim 18, wherein the normal-model creation means includes:

a learning-data selection unit selecting learning data for each mode divided by the mode dividing means from the feature vector acquired by the feature-vector computation means; and a normal-model creation unit acquiring the normal model by using the learning data selected for each mode by using the learning-data selection unit.

20. The device for monitoring the state of facility according to claim 19, further comprising:

a learning-data check means checking sufficiency of the learning data for each divided mode, which is selected by using the learning-data selection unit of the normal-model creation means, wherein a threshold of an anomaly measurement for judging the anomaly is set for each divided mode in accordance with a result of checking the sufficiency of the learning data for each divided mode in the learning-data check means.

21. The device for monitoring the state of facility according to claim 20, further comprising:

a display means displaying the anomaly measurement computed by using the means for setting the threshold and the set threshold of the anomaly measurement on the screen.

* * * * *